(12) United States Patent
Iijima et al.

(10) Patent No.: US 8,409,339 B2
(45) Date of Patent: Apr. 2, 2013

(54) $CO_2$ RECOVERY SYSTEM AND METHOD

(75) Inventors: Masaki Iijima, Hiroshima (JP); Takashi Kamijo, Hiroshima (JP); Takahito Yonekawa, Hiroshima (JP); Tomio Mimura, Osaka (JP); Yasuyuki Yagi, Osaka (JP)

(73) Assignees: Mitsubishi Heavy Industries, Ltd., Tokyo (JP); Kansai Electric Power Co., Inc., Osaka (JP)

( * ) Notice: Subject to any disclaimer, the term of this patent is extended or adjusted under 35 U.S.C. 154(b) by 16 days.

(21) Appl. No.: 13/013,448

(22) Filed: Jan. 25, 2011

(65) Prior Publication Data

US 2011/0113966 A1     May 19, 2011

Related U.S. Application Data

(62) Division of application No. 10/592,746, filed as application No. PCT/JP2005/004473 on Mar. 14, 2005, now Pat. No. 7,918,926.

(30) Foreign Application Priority Data

Mar. 15, 2004    (JP) ................................. 2004-073388

(51) Int. Cl.
     *B01D 53/14*       (2006.01)
(52) U.S. Cl. ................ 96/242; 95/183; 95/193; 95/209; 95/227; 95/236
(58) Field of Classification Search .................... 96/234, 96/242; 95/178–180, 183, 193–194, 209, 95/236, 227–229
See application file for complete search history.

(56) References Cited

U.S. PATENT DOCUMENTS

| | | | |
|---|---|---|---|
| 3,563,696 A * | 2/1971 | Benson ......................... | 423/223 |
| 4,035,166 A * | 7/1977 | Van Hecke ..................... | 95/163 |
| 4,073,863 A | 2/1978 | Giammarco et al. | |
| 4,160,810 A * | 7/1979 | Benson et al. ................. | 423/220 |
| 4,198,378 A * | 4/1980 | Giammarco et al. ......... | 423/220 |
| 4,675,035 A | 6/1987 | Apffel | |
| 4,973,340 A * | 11/1990 | Gross et al. .................... | 95/174 |
| 6,645,446 B1 | 11/2003 | Won et al. | |
| 6,800,120 B1 * | 10/2004 | Won et al. ....................... | 96/234 |

(Continued)

FOREIGN PATENT DOCUMENTS

| | | |
|---|---|---|
| CA | 2491163 A1 | 1/2004 |
| JP | 51-077580 A | 7/1976 |

(Continued)

OTHER PUBLICATIONS

Kohl A. L. et al. : "Gas Purification, fifth edition" 1997, Gulf Publishing Company, Houston, Texas, XP0025344459, pp. 57-59.

(Continued)

*Primary Examiner* — Duane Smith
*Assistant Examiner* — Ives Wu
(74) *Attorney, Agent, or Firm* — Westerman, Hattori, Daniels & Adrian, LLP

(57) ABSTRACT

A $CO_2$ recovery system includes an absorption tower and a regeneration tower. $CO_2$ rich solution is produced in the absorption tower by absorbing $CO_2$ from $CO_2$-containing gas. The $CO_2$ rich solution is conveyed to the regeneration tower where lean solution is produced from the rich solution by removing $CO_2$. A regeneration heater heats lean solution that accumulates near a bottom portion of the regeneration tower with saturated steam thereby producing steam condensate from the saturated steam. A steam-condensate heat exchanger heats the rich solution conveyed from the absorption tower to the regeneration tower with the steam condensate.

1 Claim, 22 Drawing Sheets

U.S. PATENT DOCUMENTS

| | | | |
|---|---|---|---|
| 7,377,967 B2 | 5/2008 | Reddy et al. | |
| 7,918,926 B2 | 4/2011 | Iijima et al. | |
| 2004/0036055 A1 | 2/2004 | Asprion et al. | |
| 2006/0032377 A1* | 2/2006 | Reddy et al. | 96/234 |

FOREIGN PATENT DOCUMENTS

| | | | |
|---|---|---|---|
| JP | 07-051537 A | 2/1995 |
| JP | 11-137960 A | 5/1999 |
| JP | 2002530187 T | 9/2002 |
| JP | 2004-504131 A | 2/2004 |
| WO | 2004-005818 A2 | 1/2004 |

OTHER PUBLICATIONS

Japanese Office Action dated Feb. 23, 2010, issued in corresponding Japanese Patent Application No. 2004-073388.

Canadian Office Action Dated Nov. 14, 2008, issued in corresponding Canadian Patent Application No. 2,559,744.

International Search Report of PCT/JP2005/004473, mailing date Jun. 21, 2005.

European Search Report dated Aug. 20, 2009, issued in corresponding European Patent Application No. 05720741.

Suda T et al.: "Development of Flue gas carbon dioxide recovery technology" Energy Conversion and Management, vol. 33, No. 5-8, May 1, 1992, pp. 317-324, XP025413006, Elsevier Science Publishers, Oxford, GB.

Mimra T et al.: "Develpment of Energy Saving Technology for Flue Gas Carbon Dioxide Recovery in Power Plant by Chemical Absorption Method and Stem System" Energy Conversion and Managment, vol. 38, No. 1001, Jan. 1, 1997, pp. S57-S62, XP004061575, Elsevier Science Publishers, Oxford, GB.

Japanese Office Action dated Nov. 2, 2010, issued in corresponding Japanese Patent Application No. 2004-073388. (Partial English Translation).

US Office Action dated Apr. 12, 2012, issued in corresponding U.S. Appl. No. 13/013,419, (12 pages).

US Office Action dated Aug. 27, 2012, issued in corresponding U.S. Appl. No. 13/013,467, (16 pages).

US Office Action dated Aug. 8, 2012, issued in corresponding U.S. Appl. No. 13/013,419, (10 pages).

\* cited by examiner

CO₂ RECOVERY SYSTEM AND METHOD

CROSS-REFERENCE TO RELATED APPLICATION

This application is a Divisional of U.S. application Ser. No. 10/592,746, filed Jul. 9, 2007, and wherein application Ser. No. 10/592,746 is a national stage application filed under 35 USC §371 of International Application No. PCT/JP2005/004473, filed on Mar. 14, 2005, which claims priority of Japan Application No. 2004-073388, filed Mar. 15, 2004, the entire contents of which are herein incorporated by reference.

TECHNICAL FIELD

The present invention relates to a $CO_2$ recovery system and method for achieving energy saving.

BACKGROUND ART

In recent years the greenhouse effect due to $CO_2$ has been pointed out as one of causes of the global warming, and a countermeasure against it is urgently required internationally to protect global environment. $CO_2$ sources range various fields of human activities, including burning of fossil fuels, and demands to suppress their $CO_2$ emission from these sources are on constant increase. In association with this, people have energetically studied means and methods for suppressing emission of $CO_2$ from power generation facilities such as power plants which use an enormous amount of fossil fuels. One of the methods includes bringing combustion exhaust gas of boilers into contact with an amine-based $CO_2$-absorbing solution. This method allows removal and recovery of $CO_2$ from the combustion exhaust gas. Another method includes storing recovered $CO_2$, i.e., not returning the recovered $CO_2$ to the atmosphere.

Various methods are known to remove and recover $CO_2$ from combustion exhaust gas using the $CO_2$-absorbing solution. One of the methods includes contacting the combustion exhaust gas with the $CO_2$-absorbing solution in an absorption tower, heating an absorbing solution having absorbed $CO_2$ in a regeneration tower, and releasing $CO_2$, regenerating the absorbing solution, and circulating the regenerated absorbing solution to the absorption tower again to be reused (Patent document 1).

Patent document 1: Japanese Patent Application Laid-Open No. H7-51537.

DISCLOSURE OF INVENTION

Problem to be Solved by the Invention

In the conventional method, however, the steps of removing, and recovering $CO_2$ from $CO_2$-containing gas are provided additionally in combustion facilities, and hence, the operation costs should be reduced as much as possible. Particularly, among the processes, a regenerating process consumes a large amount of heat energy, and therefore, the regenerating process needs to be provided as an energy saving process as much as possible.

The present invention has been achieved to solve the problems, and it is an object of the present invention to provide a $CO_2$ recovery system and method in which an energy efficiency is further improved.

Means for Solving Problem

To solve the above problems, a first aspect of the present invention relates to a $CO_2$ recovery system including an absorption tower that contacts $CO_2$-containing gas with a $CO_2$-absorbing solution to remove $CO_2$ and a regeneration tower that regenerates a rich solution having absorbed $CO_2$, and reusing a lean solution, obtained by removing $CO_2$ from the rich solution in the regeneration tower, in the absorption tower, comprising a regeneration heater that extracts the lean solution recovered near a bottom portion of the regeneration tower to the outside, and heat-exchanges the lean solution with saturated steam; and a steam-condensate heat exchanger that heats the rich solution to be supplied to the regeneration tower or heats a semi-lean solution obtained by removing part of $CO_2$ from the rich solution, with residual heat of steam condensate fed from the regeneration heater, the semi-lean solution having been extracted from a middle portion of the regeneration tower.

According to a second aspect of the present invention, in the invention according to the first aspect, the steam-condensate heat exchanger is interposed in a rich-solution supply pipe for feeding a rich solution from the absorption tower, and a flash drum is provided in either an upstream side or a downstream side of the steam-condensate heat exchanger.

According to a third aspect of the present invention, in the invention according to the second aspect, the $CO_2$ recovery system further includes a branching node provided in the rich-solution supply pipe and dividing a rich solution; a steam-condensate heat exchanger that is provided in a first rich-solution supply pipe, and heats the rich solution; a flash drum provided in the downstream side of the steam-condensate heat exchanger; and a semi-lean-solution heat exchanger that is provided in a second rich-solution supply pipe, and heats the rich solution with residual heat of a semi-lean solution obtained by removing part of $CO_2$ from the rich solution in the flash drum.

According to a fourth aspect of the present invention, in the invention according to the first aspect, the $CO_2$ recovery system further includes a branching node provided in a rich-solution supply pipe and dividing a rich solution; a steam-condensate heat exchanger that is provided in an end of a first rich-solution supply pipe, and flashes the rich solution; and a semi-lean-solution heat exchanger that is provided in a second rich-solution supply pipe, and heats the rich solution with residual heat of a semi-lean solution obtained by removing part of $CO_2$ from the rich solution in the steam-condensate heat exchanger. An end of a semi-lean-solution supply pipe for supplying the semi-lean solution is connected to a middle stage portion of the absorption tower.

According to a fifth aspect of the present invention, in the invention according to the fourth aspect, the steam-condensate heat exchanger that flashes the rich solution includes a flash drum in which a flash portion, for flashing the rich solution, is provided in its upper side, a filling layer provided in the flash drum, and a steam supply unit provided in a lower portion of the flash drum and supplying steam obtained from steam condensate.

According to a sixth aspect of the present invention, in the invention according to the first aspect, the $CO_2$ recovery system further includes an upper-portion regeneration tower and a lower-portion regeneration tower obtained by dividing the regeneration tower into upper and lower portions; a branching node provided in a rich-solution supply pipe and dividing a rich solution; a steam-condensate heat exchanger interposed in a first rich-solution supply pipe branched; and a semi-lean-solution heat exchanger that is provided in a second rich-solution supply pipe, and heats the rich solution with residual heat of a semi-lean solution obtained by removing part of $CO_2$ from the rich solution in the upper-portion regeneration tower. The first rich-solution supply pipe is connected to the lower-portion regeneration tower, and an end of the second rich-solution supply pipe is connected to the upper-portion regeneration tower, and an end of a semi-lean-solution supply pipe for supplying the semi-lean solution is connected to a middle stage portion of the absorption tower.

According to a seventh aspect of the present invention, in the invention according to any one of first to sixth aspects, the $CO_2$ recovery system further includes a lean-solution heat exchanger that is interposed in a rich-solution supply pipe, and heats the rich solution with residual heat of a lean solution fed from the regeneration tower.

According to an eighth aspect of the present invention, in the invention according to the first aspect, the $CO_2$ recovery system further includes an upper-portion regeneration tower, a middle-portion regeneration tower, and a lower-portion regeneration tower obtained by dividing the regeneration tower into upper, middle, and lower portions; a branching node provided in a rich-solution supply pipe and dividing a rich solution; a lean-solution heat exchanger interposed in a first rich-solution supply pipe branched; a semi-lean-solution heat exchanger that is provided in a second rich-solution supply pipe, and heats the rich solution with residual heat of a semi-lean solution obtained by removing part of $CO_2$ from the rich solution in the upper-portion regeneration tower; and a steam-condensate heat exchanger that extracts a semi-lean solution, obtained by removing part of $CO_2$ from the rich solution in the middle-portion regeneration tower, to the outside of the regeneration tower, and heats the semi-lean solution. An end of the first rich-solution supply pipe is connected to the middle-portion regeneration tower, and an end of a supply pipe for supplying the semi-lean solution is connected to a middle stage portion of the absorption tower.

According to a ninth aspect of the present invention, in the invention according to the first aspect, the regeneration tower is divided into at least two stages, and the $CO_2$ recovery system further includes a steam-condensate heat exchanger that heats a semi-lean solution obtained by removing part of $CO_2$ from the rich solution, with residual heat of the steam condensate, the semi-lean solution having been extracted from an upper stage side of the regeneration tower divided, wherein the semi-lean solution heated is supplied to a lower stage side of the regeneration tower.

According to a tenth aspect of the present invention, in the invention according to the first aspect, the regeneration tower is divided into at least two stages, and the $CO_2$ recovery system further includes a steam-condensate heat exchanger that heats a semi-lean solution obtained by removing part of $CO_2$ from the rich solution, with residual heat of the steam condensate, the semi-lean solution having been extracted from an upper stage side of the regeneration tower divided; and a lean-solution heat exchanger interposed in a rich-solution supply pipe, the lean-solution heat exchanger supplying the semi-lean solution heated to a lower stage side of the regeneration tower and heating the rich solution with residual heat of the lean solution fed from the regeneration tower.

According to an eleventh aspect of the present invention, in the invention according to the first aspect, the regeneration tower is divided into at least two stages, and the $CO_2$ recovery system further includes a steam-condensate heat exchanger that heats a semi-lean solution obtained by removing part of $CO_2$ from the rich solution, with residual heat of the steam condensate, the semi-lean solution having been extracted from an upper stage side of the regeneration tower divided; a lean-solution heat exchanger interposed in a rich-solution supply pipe, the lean-solution heat exchanger supplying the semi-lean solution heated to a lower stage side of the regeneration tower and heating the rich solution with residual heat of the lean solution fed from the regeneration tower; a first branching node provided in the rich-solution supply pipe and dividing the rich solution; a first lean-solution heat exchanger interposed in a first rich-solution supply pipe branched at the first branching node; a semi-lean-solution heat exchanger that is provided in a second rich-solution supply pipe branched at the first branching node, and heats the rich solution with residual heat of a semi-lean solution obtained by removing part of $CO_2$ from the rich solution in the upper-portion regeneration tower; a second lean-solution heat exchanger in which a joint solution joined between the first rich-solution supply pipe and the second rich-solution supply pipe is heat-exchanged after heat exchange is performed in the semi-lean-solution heat exchanger; a second branching node provided in the downstream side of the semi-lean-solution heat exchanger; and a steam-condensate heat exchanger interposed in a first semi-lean-solution supply pipe branched at the second branching node. An end of the first semi-lean-solution supply pipe is connected to a lower stage side of the regeneration tower, and an end of a second semi-lean-solution supply pipe branched at the second branching node is connected to a middle stage portion of the absorption tower.

According to a twelfth aspect of the present invention, in the invention according to the first aspect, the regeneration tower is divided into at least two stages, and the CO2 recovery system further includes a lean-solution heat exchanger that heats a semi-lean solution obtained by removing part of CO2 from the rich solution, with residual heat of the lean solution fed from the regeneration tower, the semi-lean solution having been extracted from an upper stage side of the regeneration tower divided, wherein the lean solution heated is supplied to a lower stage side of the regeneration tower.

According to a thirteenth aspect of the present invention, in the invention according to the first aspect, the CO2 recovery system further includes a first lean-solution heat exchanger that heats a semi-lean solution obtained by removing part of CO2 from the rich solution, with residual heat of the lean solution fed from the regeneration tower, the semi-lean solution having been extracted from an upper stage side of the regeneration tower divided, and the first lean-solution heat exchanger being arranged next to a steam-condensate heat exchanger; and a second lean-solution heat exchanger that is provided in a rich-solution supply pipe and heats the rich solution with residual heat of the lean solution obtained after the semi-lean solution is heated.

According to a fourteenth aspect of the present invention, in the invention according to the first aspect, the CO2 recovery system further includes an upper-portion regeneration tower, a middle-portion regeneration tower, and a lower-portion regeneration tower obtained by dividing the regeneration tower into upper, middle, and lower portions; a first lean-solution heat exchanger that heats a semi-lean solution obtained by removing part of CO2 from the rich solution, with the lean solution fed from the regeneration tower, the semi-lean solution having been extracted from the upper-portion regeneration tower; a first steam-condensate heat exchanger that heats a semi-lean solution obtained by removing part of CO2 from the rich solution, with the steam condensate, the semi-lean solution having been extracted from the middle-portion regeneration tower; a semi-lean-solution heat exchanger that is provided in a rich-solution supply pipe, and heats the rich solution with the part of the semi-lean solution extracted from the middle-portion regeneration tower; and a second lean-solution heat exchanger that is provided in the downstream side of the semi-lean-solution heat exchanger in the rich-solution supply pipe, and heats the rich solution with residual heat of the lean solution obtained after the semi-lean solution is heated. The semi-lean solution respectively heated is supplied to the lower stage side in the regeneration tower, and the semi-lean solution, after being heat-exchanged in the semi-lean-solution heat exchanger, is supplied to a middle stage portion of the absorption tower.

According to a fifteenth aspect of the present invention, in the invention according to any one of the fourth, fifth, eighth, eleventh, and fourteenth aspects, the absorption tower is divided into two stages: upper and lower stages, and the semi-lean solution to be supplied to a middle stage portion of the absorption tower is jointed with a semi-lean solution extracted from the upper-stage absorption tower, to be supplied to the lower-stage absorption tower.

A sixteenth aspect of the present invention relates to a $CO_2$ recovery system including an absorption tower that contacts $CO_2$-containing gas with a $CO_2$-absorbing solution to remove $CO_2$ and a regeneration tower that regenerates a rich solution having absorbed $CO_2$, and reusing a lean solution, obtained by removing $CO_2$ from the rich solution in the regeneration tower, in the absorption tower, a regeneration heater that heat-exchanges a solution recovered to a bottom portion of the regeneration tower with saturated steam; and a steam-condensate heat exchanger that heats the rich solution with residual heat of steam condensate.

A seventeenth aspect of the present invention relates to a $CO_2$ recovery system including an absorption tower that contacts $CO_2$-containing gas with a $CO_2$-absorbing solution to remove $CO_2$ and a regeneration tower that regenerates a rich solution having absorbed $CO_2$, and reusing a lean solution, obtained by removing $CO_2$ from the rich solution in the regeneration tower, in the absorption tower, a regeneration heater that heat-exchanges a solution recovered to a bottom portion of the regeneration tower with saturated steam; and a steam-condensate heat exchanger that heats a semi-lean solution, obtained by removing part of $CO_2$ from the lean solution, with residual heat of steam condensate, the semi-lean solution having been extracted from a middle portion of the regeneration tower.

A eighteenth aspect of the present invention relates to a $CO_2$ recovery system including an absorption tower that contacts $CO_2$-containing gas with a $CO_2$-absorbing solution to remove $CO_2$ and a regeneration tower that regenerates a rich solution having absorbed $CO_2$, and reusing a lean solution, obtained by removing $CO_2$ from the rich solution in the regeneration tower, in the absorption tower, a lean-solution heat exchanger that heats a semi-lean solution, obtained by removing part of $CO_2$ from the rich solution, with residual heat of a lean solution, the semi-lean solution having been extracted from a middle portion of the regeneration tower.

A nineteenth aspect of the present invention relates to a $CO_2$ recovery method including contacting $CO_2$-containing gas with a $CO_2$ absorbing solution in an absorption tower to remove $CO_2$, regenerating a rich solution having absorbed $CO_2$ in a regeneration tower, and reusing a lean solution, regenerated by removing $CO_2$ from the rich solution, in the absorption tower, heat-exchanging a solution recovered to a bottom portion of the regeneration tower with steam; and heating the rich solution with residual heat of steam condensate.

A twentieth aspect of the present invention relates to a $CO_2$ recovery method including contacting $CO_2$-containing gas with a $CO_2$ absorbing solution in an absorption tower to remove $CO_2$, regenerating a rich solution having absorbed $CO_2$ in a regeneration tower, and reusing a lean solution, regenerated by removing $CO_2$ from the rich solution, in the absorption tower, heat-exchanging a solution recovered to a bottom portion of the regeneration tower with steam; and heating a semi-lean solution obtained by removing part of $CO_2$ from the rich solution, with residual heat of steam condensate, the semi-lean solution having been extracted from a middle portion of the regeneration tower.

A twenty-first aspect of the present invention relates to a $CO_2$ recovery method including contacting $CO_2$-containing gas with a $CO_2$ absorbing solution in an absorption tower to remove $CO_2$, regenerating a rich solution having absorbed $CO_2$ in a regeneration tower, and reusing a lean solution, regenerated by removing $CO_2$ from the rich solution, in the absorption tower, heating a semi-lean solution obtained by removing part of $CO_2$ from the rich solution, with residual heat of a lean solution, the semi-lean solution having been extracted from a middle portion of the regeneration tower.

Effect of the Invention

According to the present invention, it is possible to provide a $CO_2$ recovery system and method in which energy saving is achieved by using residual heat of steam condensate.

Furthermore, it is possible to provide a $CO_2$ recovery system and method with improved energy efficiency by heating a semi-lean solution with residual heat of a lean solution, the semi-lean solution obtained by removing part of $CO_2$ from a rich solution and extracted from the middle of the regeneration tower when the rich solution having absorbed $CO_2$ is regenerated in the regeneration tower.

EXPLANATIONS OF LETTERS OR NUMERALS

Figure 1:
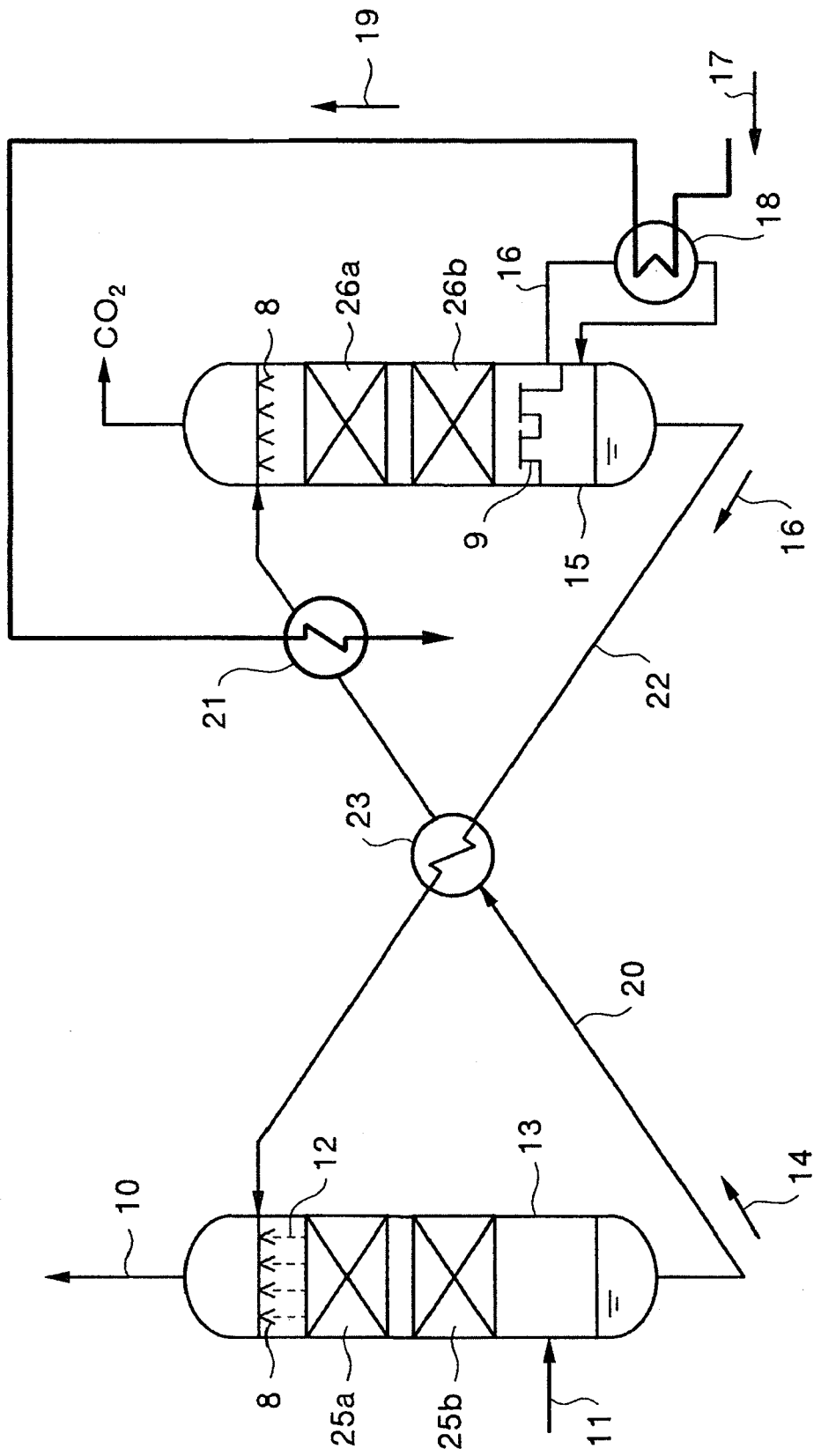
FIG. 1 is a schematic of a $CO_2$ recovery system according to a first embodiment.

11 CO2-containing gas
12 CO2-absorbing solution
13 Absorption tower
14 Rich solution
15 Regeneration tower
16 Lean solution
17 Steam
18 Regeneration heater
19 Steam condensate
21 Steam-condensate heat exchanger
22 Lean-solution supply pipe
23 Lean-solution heat exchanger
8 Nozzle
9 Chimney tray
10 CO2-removed exhaust gas

BEST MODE(S) FOR CARRYING OUT THE INVENTION

The present invention is explained in detail below with reference to the attached drawings. It is noted that the present invention is not limited by its exemplary embodiments and examples. It is also noted that components in the following embodiments and examples contain those persons skilled in the art can easily think of or those substantially equivalent thereto.

The embodiments of the present invention are explained first, and the exemplary examples are explained in detail next.

First Embodiment

FIG. 1 is a schematic of a CO2 recovery system according to a first embodiment.

As shown in FIG. 1, the CO2 recovery system according to the first embodiment of the present invention includes an absorption tower 13 that makes CO2-containing gas 11 containing CO2 to contact with a CO2-absorbing solution 12 to produce a CO2-rich solution 14; and a regeneration tower 15 that regenerates a rich solution 14 to produce a lean solution (regenerated solution) 16. The regenerated solution 16 is reused in the absorption tower 13. The CO2 recovery system includes a regeneration heater 18 that implements heat exchange between the lean solution 16, which accumulates near the bottom of the regeneration tower 15, and high temperature steam 17; a rich-solution supply pipe 20 which supplies the rich solution 14 from the absorption tower 13 to the regeneration tower 15; a steam-condensate heat exchanger 21 that is provided in rich-solution supply pipe 20 and heats the rich solution 14 with the residual heat of steam condensate 19 fed from the regeneration heater 18.

In the first embodiment, the lean solution 16 being the regenerated solution is supplied from the regeneration tower 15 to the absorption tower 13 through a lean-solution supply pipe 22. A lean-solution heat exchanger 23, which heats the rich solution 14 with residual heat of the lean solution 16, is provided in the rich-solution supply pipe 20.

In FIG. 1, reference numeral 8 represents a nozzle, 9 a chimney tray, 10 CO2-removed exhaust gas, 25a and 25b filling layers provided in the absorption tower 13, and 26a and 26b filling layers provided in the regeneration tower 15.

The heat exchanger used in the first embodiment is not particularly limited. In other words, a known heat exchanger such as a plate heat exchanger and a shell and tube heat exchanger can be used.

The CO2-absorbing solution used in the present invention is not particularly limited. For example, an alkanolamine and a hindered amine group having alkanolamine and alcoholic hydroxyl can be exemplified. The alkanolamine can be exemplified by monoethanolamine, diethanolamine, triethanolamine, methyldiethanolamine, diisopropanolamine, diglycolamine, and the like, but generally, monoethanolamine (MEA) is preferably used. The hindered amine having alcoholic hydroxyl can be exemplified by 2-amino-2-methyl-1-propanol (AMP), 2-(ethylamino)-ethanol (EAE), 2-(methylamino)-ethanol (MAE), and 2-(diethylamino)-ethanol (DEAE).

Thus, there is provided the steam-condensate heat exchanger 21 that heats the rich solution 14 with the residual heat of the steam condensate 19 fed from the regeneration heater 18. Thus, the residual heat of the steam condensate 19 can be effectively used to raise the supply temperature of the rich solution 14 to be supplied to the regeneration tower 15, so that reduction in the supply amount of steam used in the regeneration tower 15 can be achieved.

The CO2-containing gas 11 to be supplied to a CO2 recovery device is first cooled by a cooling device (not shown) to about 40° C. to 50° C. and supplied to the CO2 recovery device. On the other hand, the lean solution 16 which is the absorbing solution 12 regenerated is cooled to about 40° C. by a cooling device (not shown).

The rich solution 14 output from the absorption tower 13 of the CO2 removal device is sent toward the regeneration tower 15 at about 50° C. due to heat reaction. The rich solution 14 is then heated up to about 110° C. in the lean-solution heat exchanger 23 and supplied to the regeneration tower 15. However, by providing the steam-condensate heat exchanger 21 in which the rich solution 14 is heat-exchanged with the heat (e.g., 137° C.) of the steam condensate 19, the temperature of the rich solution 14 can be increased by several degrees.

In the configuration of FIG. 1, a flash drum for causing the rich solution to flash can be provided in either one of an upstream side and a downstream side of the steam-condensate heat exchanger 21, and the flash drum can be made to discharge CO2 contained in the rich solution in the outside of the regeneration tower. According to such configuration, part of CO2 in the rich solution 14 to be regenerated in the regeneration tower 15 is previously removed by the flash drum, and it becomes possible to reduce the supply amount of steam to be used for CO2 removal in the regeneration tower 15.

Second Embodiment

Figure 2:
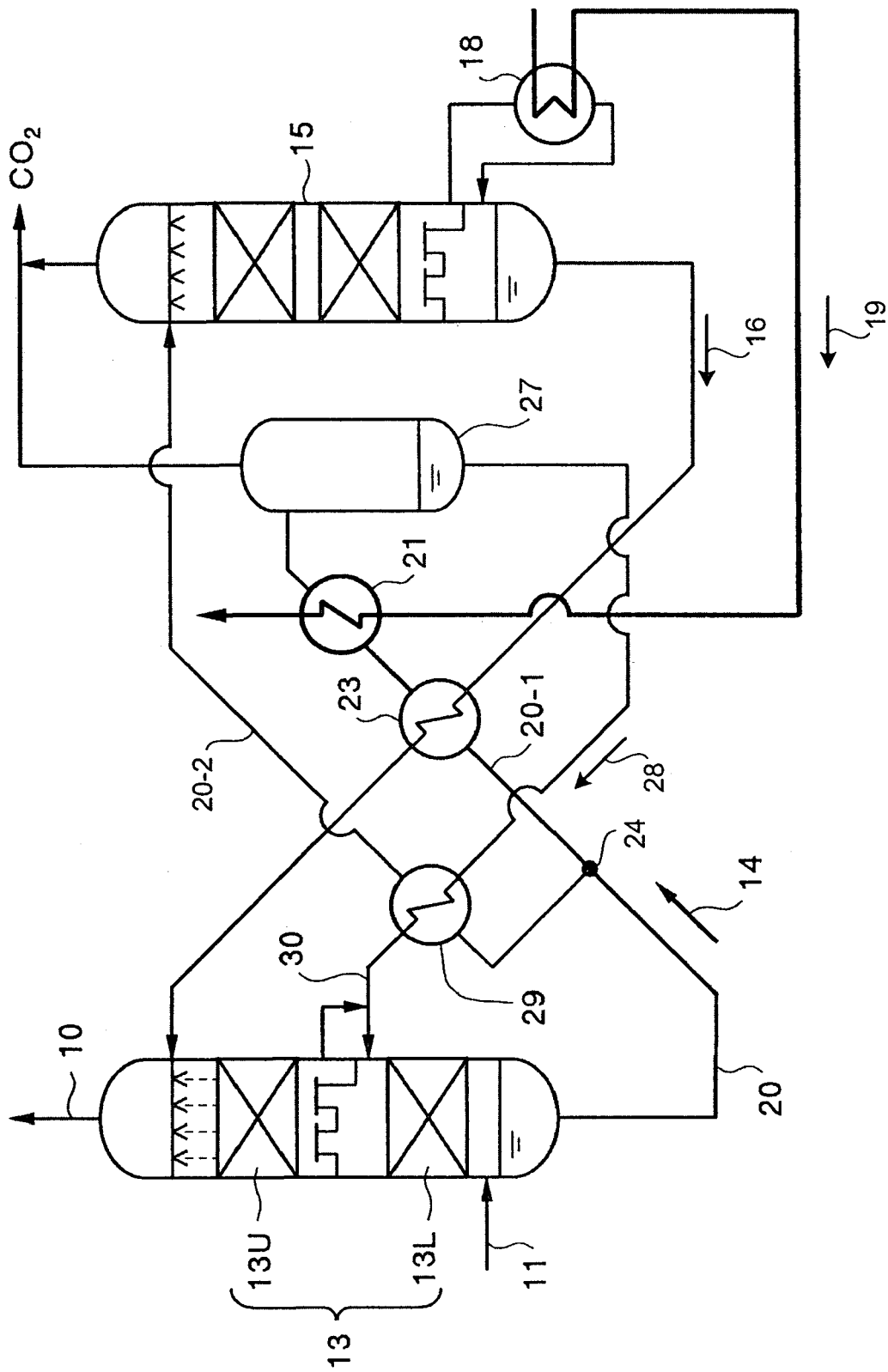
FIG. 2 is a schematic of a $CO_2$ recovery system according to a second embodiment.

FIG. 2 is a schematic of a CO2 recovery system according to a second embodiment.

Components the same as those of the CO2 recovery system according to the first embodiment are assigned with the same reference numerals, and explanation thereof is omitted.

As shown in FIG. 2, the CO2 recovery system according to the second embodiment of the present invention further includes, in addition to the configuration of the first embodiment, a branching node 24 provided in the rich-solution supply pipe 20 that branches the rich solution 14 into the first rich-solution supply pipe 20-1 and the second rich-solution supply pipe 20-2; the steam-condensate heat exchanger 21 that is provided in the first rich-solution supply pipe 20-1 and heats the rich solution 14; a flash drum 27 provided in the downstream side of the steam-condensate heat exchanger 21; and a semi-lean-solution heat exchanger 29 that is provided in the second rich-solution supply pipe 20-2 and heats the rich solution 14 with the residual heat of a semi-lean solution 28 obtained by removing part of $CO_2$ from the rich solution in the flash drum 27. An end of a semi-lean-solution supply pipe 30 for supplying the semi-lean solution 28 is connected to a middle stage portion of the absorption tower 13. The second rich-solution supply pipe 20-2 is connected near the upper stage of the regeneration tower 15, and $CO_2$ is removed and recovered in the regeneration tower 15.

Thus, the steam-condensate heat exchanger 21 heats the rich solution 14 with the residual heat of the steam condensate 19 fed from the regeneration heater 18, in which the rich solution is heated with the residual heat of the steam condensate. therefore, the residual heat of the steam condensate 19 having been used in the regeneration heater 18 is effectively used. The rich solution 14 heated with the residual heat is introduced into the flash drum 27. Then, the rich solution 14 is caused to flash in the flash drum 27 to enable improvement of $CO_2$ removal efficiency. Moreover, the rich solution 14 is heat-exchanged with the residual heat of the semi-lean solution 28 obtained by removing part of $CO_2$ from the rich solution and fed from the flash drum 27, in the semi-lean-solution heat exchanger 29 interposed in the second rich-solution supply pipe 20-2 branched. Therefore, it is possible to increase the temperature of the rich solution 14 to be introduced into the regeneration tower 15, and as a result, the supply amount of steam to be used in the regeneration tower 15 can be reduced. Most of $CO_2$ is removed from the semi-lean solution 28, obtained by removing part of $CO_2$ from the rich solution, in the flash drum 27. Therefore, by supplying this semi-lean solution 28 to the middle stage portion of the absorption tower 13, $CO_2$ is absorbed without being regenerated in the regeneration tower 15.

Furthermore, $CO_2$ removed in the flash drum 27 joins $CO_2$ fed from the regeneration tower 15, to be recovered separately.

The ratio of division of the rich solution 14 into the first rich-solution supply pipe 20-1 and the second rich-solution supply pipe 20-2 at the branching node 24 is simply set to a range from 30:70 to 70:30, preferably 50:50.

The second embodiment is configured to further divide the inner side of the absorption tower 13 into two stages: an upper-stage filling layer 13-U and a lower-stage filling layer 13-L; to extract the absorbing solution 12 having absorbed $CO_2$, from the upper-stage filling layer 13-U to the outside; and to mix the absorbing solution 12 with the semi-lean solution 28 to be cooled. This is because it is preferable to decrease the temperature of a solution to be supplied because the absorption reaction is an exothermic reaction. In this embodiment, the temperature is decreased to about 40° C. to 50° C.

Third Embodiment

Figure 3:
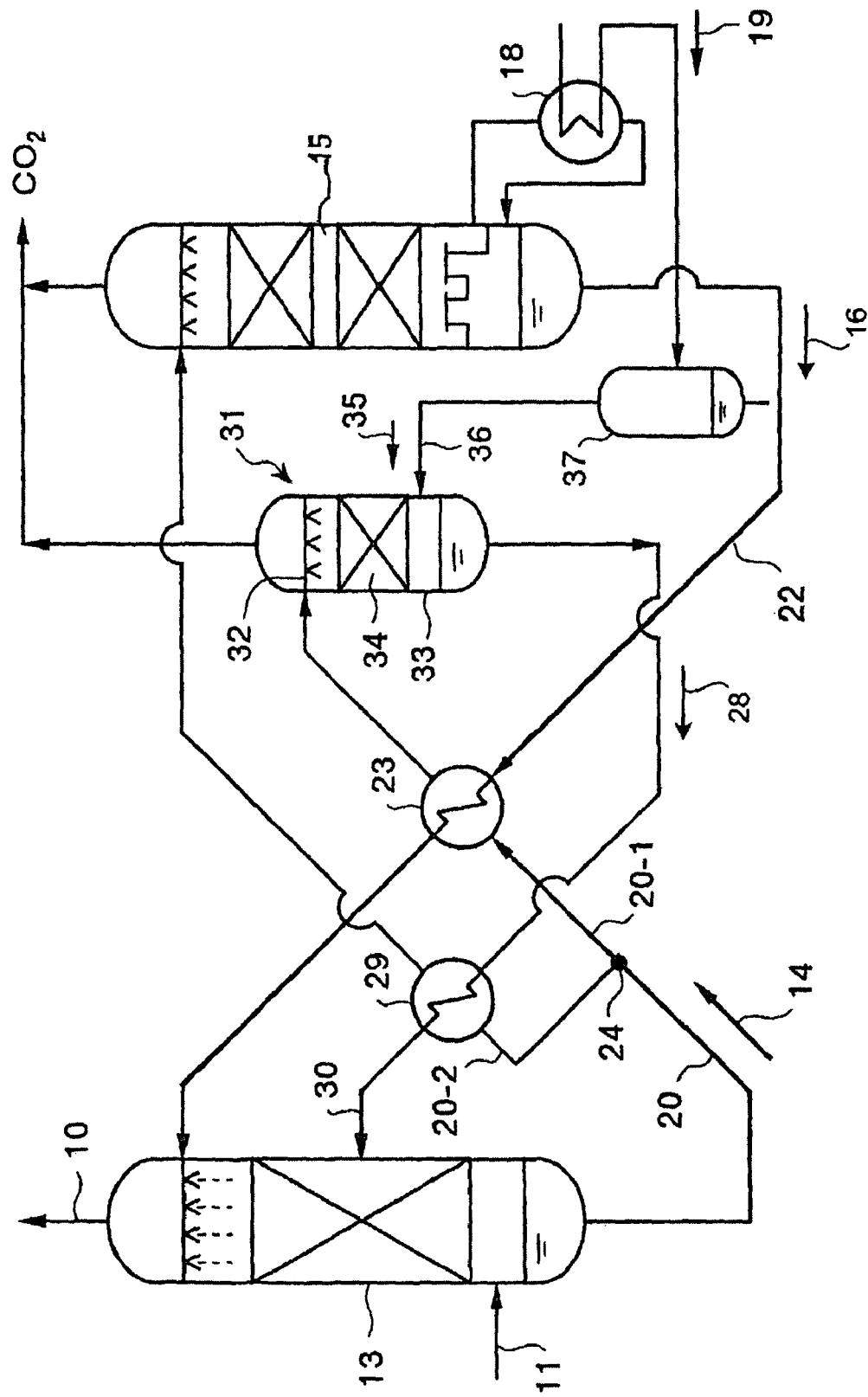
FIG. 3 is a schematic of a $CO_2$ recovery system according to a third embodiment.

FIG. 3 is a schematic of a $CO_2$ recovery system according to a third embodiment.

Components the same as those in each of the $CO_2$ recovery systems according to the first and the second embodiments are assigned with the same reference numerals, and explanation thereof is omitted.

As shown in FIG. 3, the $CO_2$ recovery system according to the third embodiment of the present invention further includes, in addition to the configuration of the first embodiment, the branching node 24 provided in the rich-solution supply pipe 20 and divides the rich solution 14 into the first rich-solution supply pipe 20-1 and the second rich-solution supply pipe 20-2; a steam-condensate heat exchanger 31 that is provided in an end of the first rich-solution supply pipe 20-1 and causes the rich solution 14 to flash; and the semi-lean-solution heat exchanger 29 that is provided in the second rich-solution supply pipe 20-2 and heats the rich solution 14 with the residual heat of the semi-lean solution 28 obtained by removing part of $CO_2$ from the rich solution in the steam-condensate heat exchanger 31. And the end of the semi-lean-solution supply pipe 30 for supplying the semi-lean solution 28 is connected to the middle stage portion of the absorption tower 13.

In the third embodiment, the steam-condensate heat exchanger 31 is not an exchanger such as the plate heat exchanger, but includes, as shown in FIG. 3, a first flash drum 33 in which a flash portion 32, for causing the rich solution 14 to flash, is provided in its upper side; a filling layer 34 provided in the first flash drum 33; and a steam supply portion 36 that is provided in the lower-portion of the flash drum and supplies steam 35 from the steam condensate 19.

If the steam condensate 19 is pressurized saturated steam, a second flash drum 37 is provided to make it as atmospheric pressure steam 35, and the steam 35 is supplied to the first flash drum 33, where $CO_2$ is removed from the rich solution 14 using the heat of the steam 35.

The semi-lean-solution heat exchanger 29 heats the rich solution 14 using the residual heat of the semi-lean solution 28 obtained by removing part of $CO_2$ from the rich solution in the first flash drum 33, and then, the rich solution is supplied to the middle stage portion of the absorption tower 13.

Thus, the steam-condensate heat exchanger 31 heats the rich solution 14 in the first rich-solution supply pipe 20-1, with the residual heat of the steam condensate 19 fed from the regeneration heater 18, in which the rich solution is heated with the steam 35. Therefore, the residual heat of the steam condensate 19 having been used in the regeneration heater 18 is effectively used. The rich solution 14 is heat-exchanged using the residual heat of the semi-lean solution 28 obtained by removing $CO_2$ by flash in the steam-condensate heat exchanger 31, in the semi-lean-solution heat exchanger 29 interposed in the second rich-solution supply pipe 20-2 branched. Therefore, it is possible to increase the temperature of the rich solution 14 to be introduced into the regeneration tower 15, and as a result, the supply amount of steam to be used in the regeneration tower 15 can be reduced.

Furthermore, $CO_2$ removed in the first flash drum 33 joins $CO_2$ fed from the regeneration tower 15, to be recovered separately.

The first flash drum 33 functions as an auxiliary regeneration tower for the regeneration tower 15.

Fourth Embodiment

Figure 4:
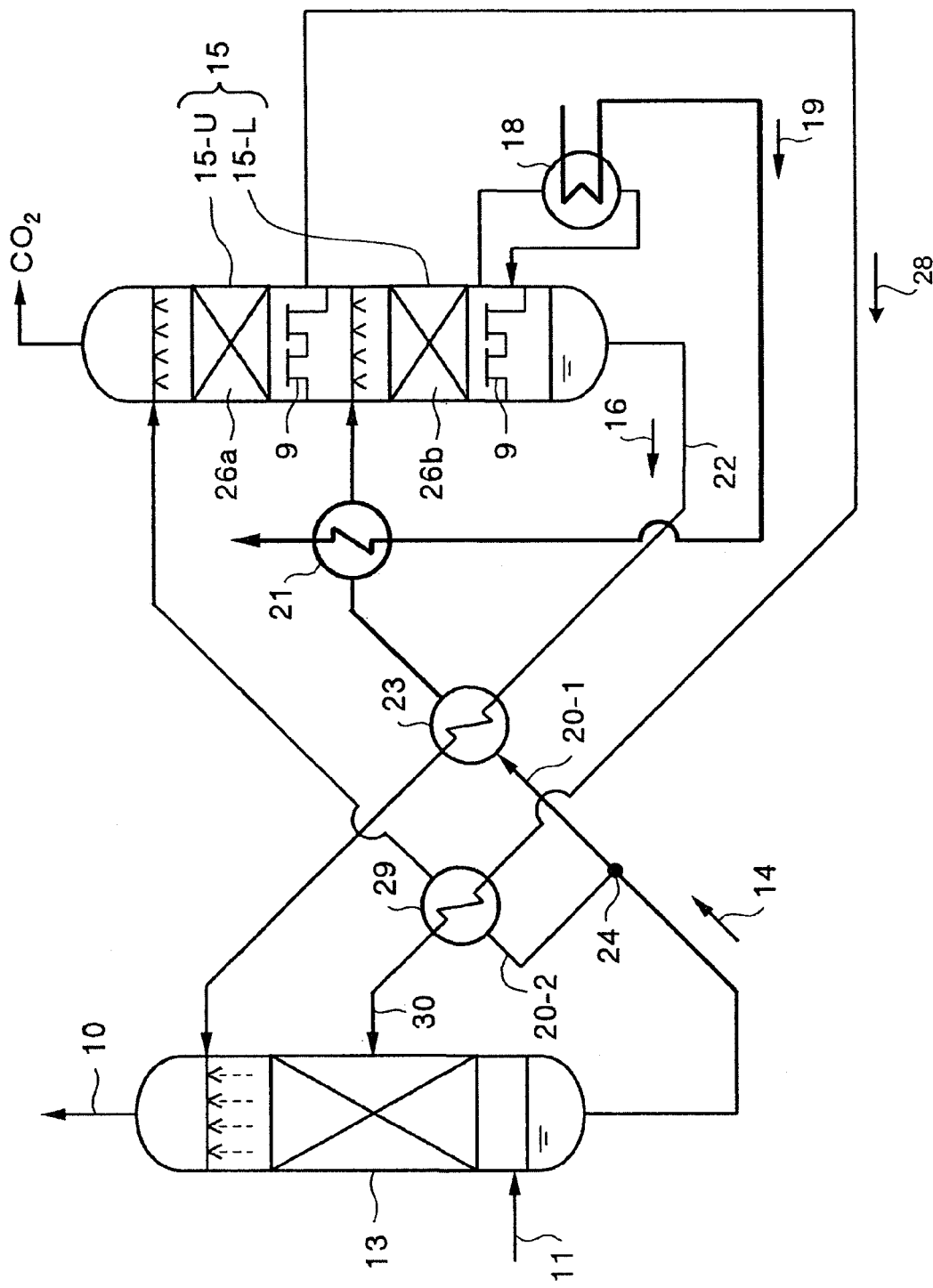
FIG. 4 is a schematic of a $CO_2$ recovery system according to a fourth embodiment.

FIG. 4 is a schematic of a $CO_2$ recovery system according to a fourth embodiment.

Components the same as those in each of the $CO_2$ recovery systems according to the first to the third embodiments are assigned with the same reference numerals, and explanation thereof is omitted.

As shown in FIG. 4, the $CO_2$ recovery system according to the fourth embodiment of the present invention further includes, in addition to the configuration of the first embodiment, an upper-portion regeneration tower 15-U and a lower-portion regeneration tower 15-L into which the inner side of the regeneration tower 15 is vertically divided; the branching node 24 provided in the rich-solution supply pipe 20 and dividing the rich solution 14; the steam-condensate heat exchanger 21 interposed in the first rich-solution supply pipe 20-1 branched; and the semi-lean-solution heat exchanger 29 that is provided in the second rich-solution supply pipe 20-2, and heats the rich solution 14 with the residual heat of the semi-lean solution 28 obtained by removing part of $CO_2$ from the rich solution in the upper-portion regeneration tower 15-U. And, the end of the first rich-solution supply pipe 20-1 is connected to the lower-portion regeneration tower 15-L, the end of the second rich-solution supply pipe 20-2 is connected to the upper-portion regeneration tower 15-U, and the end of the semi-lean-solution supply pipe 30 for supplying the semi-lean solution 28 is connected to the middle stage portion of the absorption tower 13.

The fourth embodiment is configured to provide the steam-condensate heat exchanger 21 that heats the rich solution 14 with the residual heat of the steam condensate 19 fed from the regeneration heater 18, in which the rich solution is heated with the residual heat of the steam condensate. Therefore, the residual heat of the steam condensate 19 having been used in the regeneration heater 18 is effectively used. Furthermore, the rich solution 14 heated with the residual heat is introduced into the lower-portion regeneration tower 15-L, where it is regenerated.

The semi-lean solution 28, obtained by removing part of $CO_2$ from the rich solution 14 in the upper-portion regeneration tower 15-U, is extracted to the outside through the semi-lean-solution supply pipe 30, and the rich solution 14 is heat-exchanged with the residual heat of the semi-lean solution in the semi-lean-solution heat exchanger 29 interposed in the second rich-solution supply pipe 20-2 branched. Therefore, it is possible to increase the temperature of the rich solution 14 to be introduced into the regeneration tower 15, and as a result, the supply amount of steam to be used in the regeneration tower 15 can be reduced.

The ratio of division of the rich solution 14 into the first rich-solution supply pipe 20-1 and the second rich-solution supply pipe 20-2 at the branching node 24 is simply set to a range from 25:75 to 75:25.

Fifth Embodiment

Figure 5:
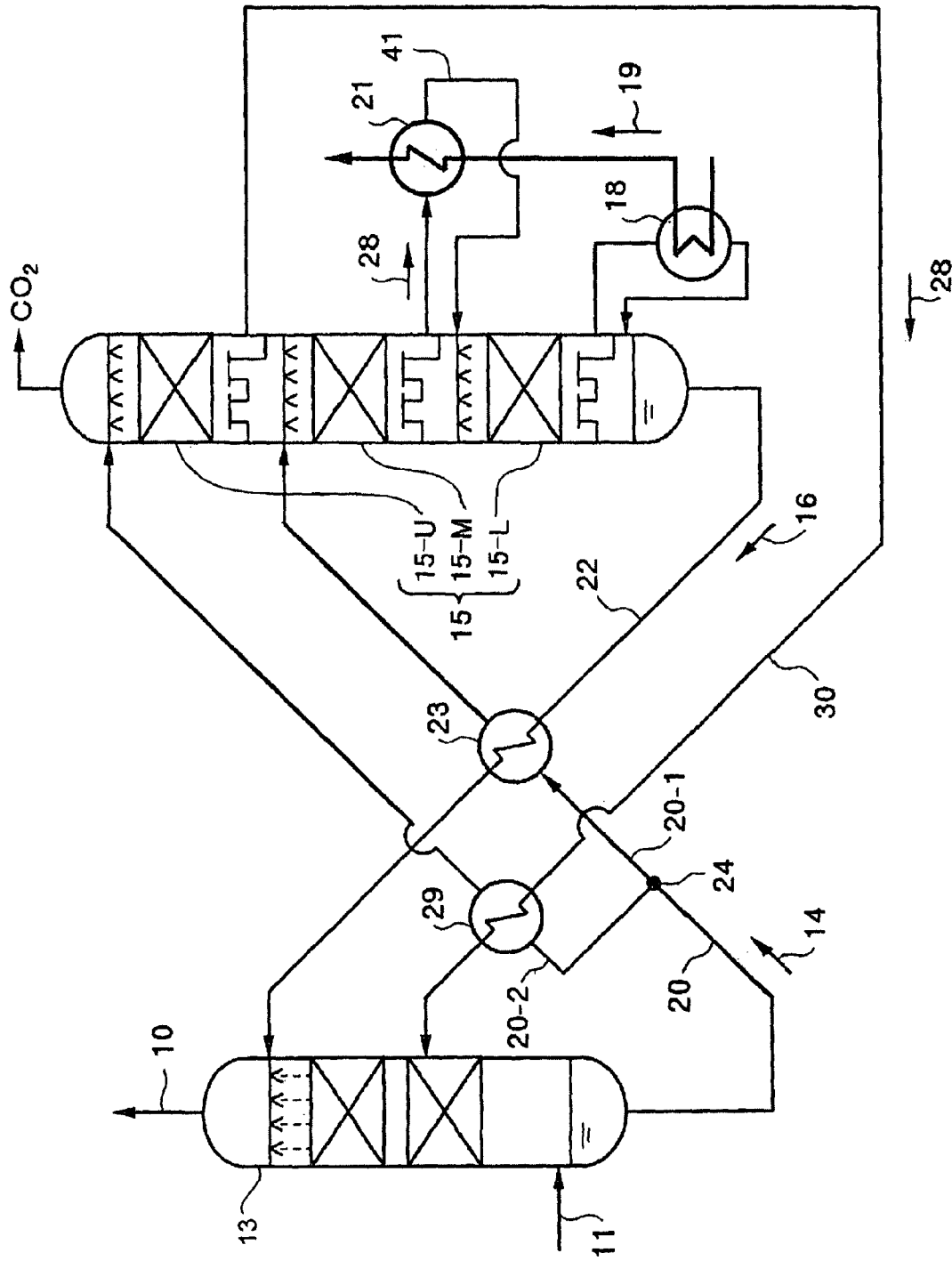
FIG. 5 is a schematic of a $CO_2$ recovery system according to a fifth embodiment.

FIG. 5 is a schematic of a $CO_2$ recovery system according to a fifth embodiment.

Components the same as those in each of the $CO_2$ recovery systems according to the first to the fourth embodiments are assigned with the same reference numerals, and explanation thereof is omitted.

As shown in FIG. 5, the $CO_2$ recovery system according to the fifth embodiment of the present invention includes the upper-portion regeneration tower 15-U, a middle-portion regeneration tower 15-M, and the lower-portion regeneration tower 15-L, which are obtained by dividing the regeneration tower 15 into three: upper, middle, and lower portions; the branching node 24 provided in the rich-solution supply pipe 20 and dividing the rich solution 14; the lean-solution heat exchanger 23 interposed in the first rich-solution supply pipe 20-1 branched; the semi-lean-solution heat exchanger 29 that is provided in the second rich-solution supply pipe 20-2, and heats the rich solution with the residual heat of the semi-lean solution 28 obtained by removing part of $CO_2$ from the rich solution in the upper-portion regeneration tower 15-U; and the steam-condensate heat exchanger 21 that extracts the semi-lean solution 28 obtained by removing part of $CO_2$ from the rich solution in the middle-portion regeneration tower 15-M, to the outside of the regeneration tower through an extraction pipe 41, and that heats the semi-lean solution 28 with the residual heat of the steam condensate 19. And, the end of the first rich-solution supply pipe 20-1 is connected to the middle-portion regeneration tower 15-M, the end of the second rich-solution supply pipe 20-2 is connected to the upper-portion regeneration tower 15-U, the extraction pipe 41 is connected to the lower-portion regeneration tower 15-L, and the end of the supply pipe 30 for supplying the semi-lean solution 28 is connected to the middle stage portion of the absorption tower 13.

The fifth embodiment is configured to provide the steam-condensate heat exchanger 21 that heats the semi-lean solution 28 extracted through the extraction pipe 41, in which the semi-lean solution 28 is heated with the residual heat of the steam condensate 19. Therefore, the residual heat of the steam condensate 19 having been used in the regeneration heater 18 is effectively used, and as a result, the supply amount of steam to be used in the regeneration tower 15 can be reduced.

Furthermore, the rich solution 14 is heat-exchanged, using the lean solution 16 regenerated in the regeneration tower 15, in the lean-solution heat exchanger 23 interposed in the first rich-solution supply pipe 20-1, and the rich solution 14 heated with the residual heat is introduced into the middle-portion regeneration tower 15-M, which allows reduction in the supply amount of steam to be used in the regeneration tower.

The semi-lean solution 28, obtained by removing part of CO2 from the rich solution in the upper-portion regeneration tower 15-U, is extracted to the outside through the semi-lean-solution supply pipe 30, and the rich solution 14 is heat-exchanged with the residual heat of the semi-lean solution 28 in the semi-lean-solution heat exchanger 29 interposed in the second rich-solution supply pipe 20-2 branched. Therefore, it is possible to increase the temperature of the rich solution 14 to be introduced into the upper-portion regeneration tower 15-U, and as a result, the supply amount of steam to be used in the regeneration tower 15 can be reduced.

The ratio of division of the rich solution 14 into the first rich-solution supply pipe 20-1 and the second rich-solution supply pipe 20-2 at the branching node 24 is simply set to a range from 25:75 to 75:25.

Sixth Embodiment

Figure 6:
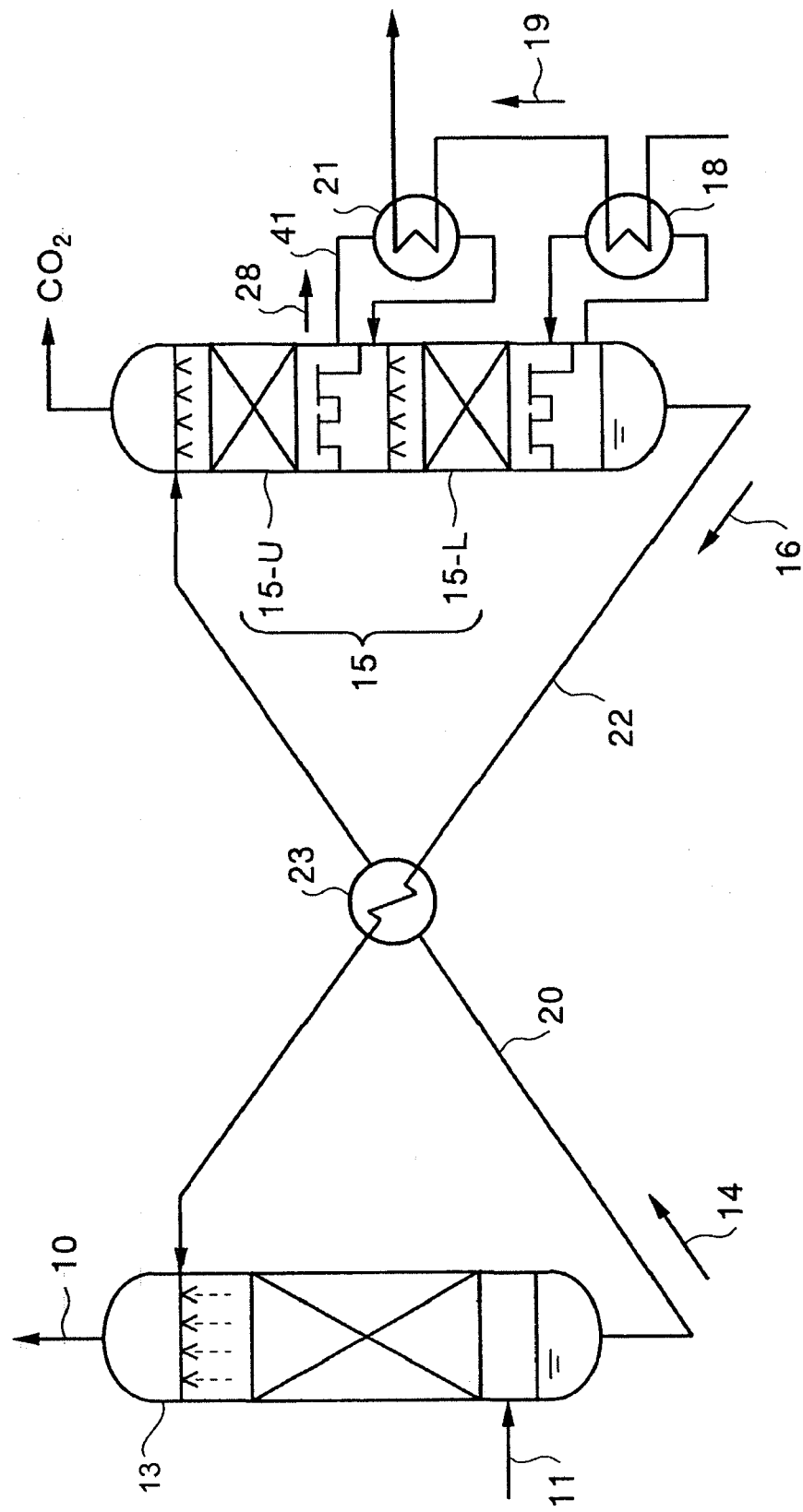
FIG. 6 is a schematic of a $CO_2$ recovery system according to a sixth embodiment.

FIG. 6 is a schematic of a CO2 recovery system according to a sixth embodiment.

Components the same as those in each of the CO2 recovery systems according to the first to the fifth embodiments are assigned with the same reference numerals, and explanation thereof is omitted.

As shown in FIG. 6, the CO2 recovery system according to the sixth embodiment of the present invention includes the upper-portion regeneration tower 15-U and the lower-portion regeneration tower 15-L, which are obtained by dividing the regeneration tower at least into two portions; and the steam-condensate heat exchanger 21 that heats the semi-lean solution 28, obtained by removing part of CO2 from the rich solution, with the residual heat of the steam condensate, the semi-lean solution 28 having been extracted from the upper-portion regeneration tower 15-U through the extraction pipe 41. And the semi-lean solution 28 heated is supplied to the lower-portion regeneration tower 15-L.

The sixth embodiment is configured to provide the steam-condensate heat exchanger 21 that heats the semi-lean solution 28 extracted through the extraction pipe 41, with the residual heat of the steam condensate 19 fed from the regeneration heater 18, in which the semi-lean solution 28 is heated with the residual heat of the steam condensate. Therefore, the residual heat of the steam condensate 19 having been used in the regeneration heater 18 is effectively used, and as a result, the supply amount of steam to be used in the regeneration tower 15 can be reduced.

Seventh Embodiment

Figure 7:
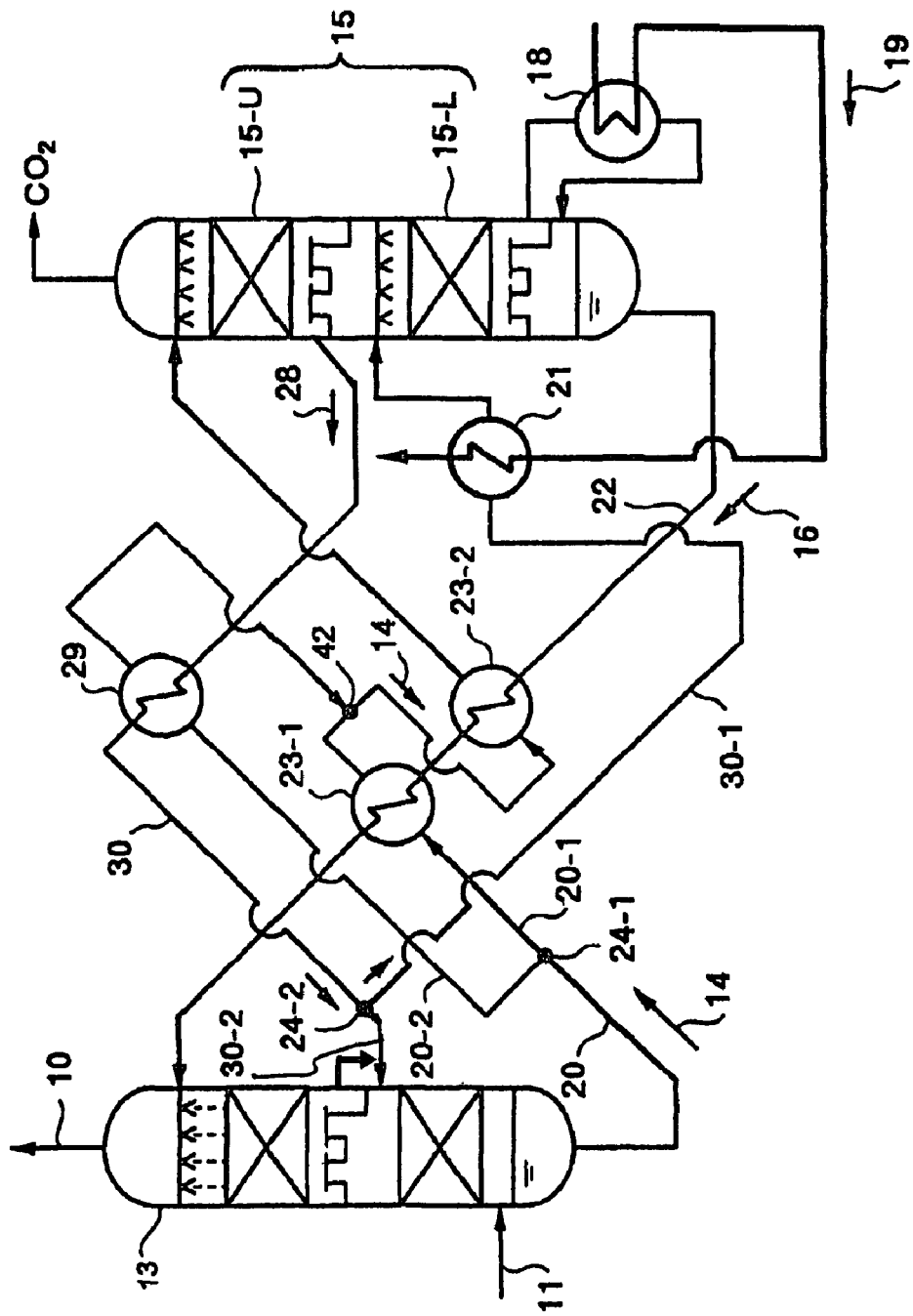
FIG. 7 is a schematic of a $CO_2$ recovery system according to a seventh embodiment.

FIG. 7 is a schematic of a CO2 recovery system according to a seventh embodiment.

Components the same as those in each of the CO2 recovery systems according to the first to the sixth embodiments are assigned with the same reference numerals, and explanation thereof is omitted.

As shown in FIG. 7, the CO2 recovery system according to the seventh embodiment of the present invention includes, in addition to the system of the sixth embodiment, a first branching node 24-1 provided in the rich-solution supply pipe 20 and dividing the rich solution 14; a first lean-solution heat exchanger 23-1 interposed in the first rich-solution supply pipe 20-1 branched at the first branching node 24-1; the semi-lean-solution heat exchanger 29 that is provided in the second rich-solution supply pipe 20-2 branched at the first branching node 24-1, and heats the rich solution 14 with the residual heat of the semi-lean solution 28 obtained by removing part of CO2 from the rich solution in the upper-portion regeneration tower 15-U; a second lean-solution heat exchanger 23-2 in which the rich solution 14 joined at a joint 42 between the first rich-solution supply pipe 20-1 and the second rich-solution supply pipe 20-2, is heat-exchanged after the heat exchange in the semi-lean-solution heat exchanger 29; a second branching node 24-2 provided in the downstream side of the semi-lean-solution heat exchanger 29 provided in the supply pipe 30 for supplying the semi-lean solution 28; and the steam-condensate heat exchanger 21 interposed in a first semi-lean-solution supply pipe 30-1 branched at the second branching node 24-2. And the end of the first semi-lean-solution supply pipe 30-1 is connected to the lower-portion regeneration tower 15-L, and the end of a second semi-lean-solution supply pipe 30-2 branched at the second branching node 24-2 is connected to the middle stage portion of the absorption tower 13.

In the seventh embodiment, the semi-lean-solution heat exchanger 29 uses the residual heat of the semi-lean solution 28 extracted from the upper-portion regeneration tower 15-U to heat the rich solution 14, and the residual heat of the semi-lean solution 28 is thereby effectively used. Moreover, because the steam-condensate heat exchanger 21 is provided in the way in which part of the semi-lean solution 28 is returned again to the lower-portion regeneration tower 15-L through the first semi-lean-solution supply pipe 30-1, the semi-lean solution 28 can be heated with the residual heat of the steam condensate 19. The residual heat of the steam condensate 19 having been used in the regeneration heater 18 is thereby effectively used, and as a result, the supply amount of steam to be used in the regeneration tower 15 can be reduced.

One part of the rich solution 14 once divided is heat-exchanged in the semi-lean-solution heat exchanger 29, and the other part of the rich solution 14 divided is also heat-exchanged in the first lean-solution heat exchanger 23-1, and these parts of the rich solution 14 are jointed at the joint 42, and are further heat-exchanged in the second lean-solution heat exchanger 23-2, to be supplied to the upper-portion regeneration tower 15-U. The temperature of the rich solution 14 to be introduced into the regeneration tower thereby increases, and as a result, the supply amount of steam to be used in the regeneration tower 15 can be reduced.

Eighth Embodiment

Figure 8:
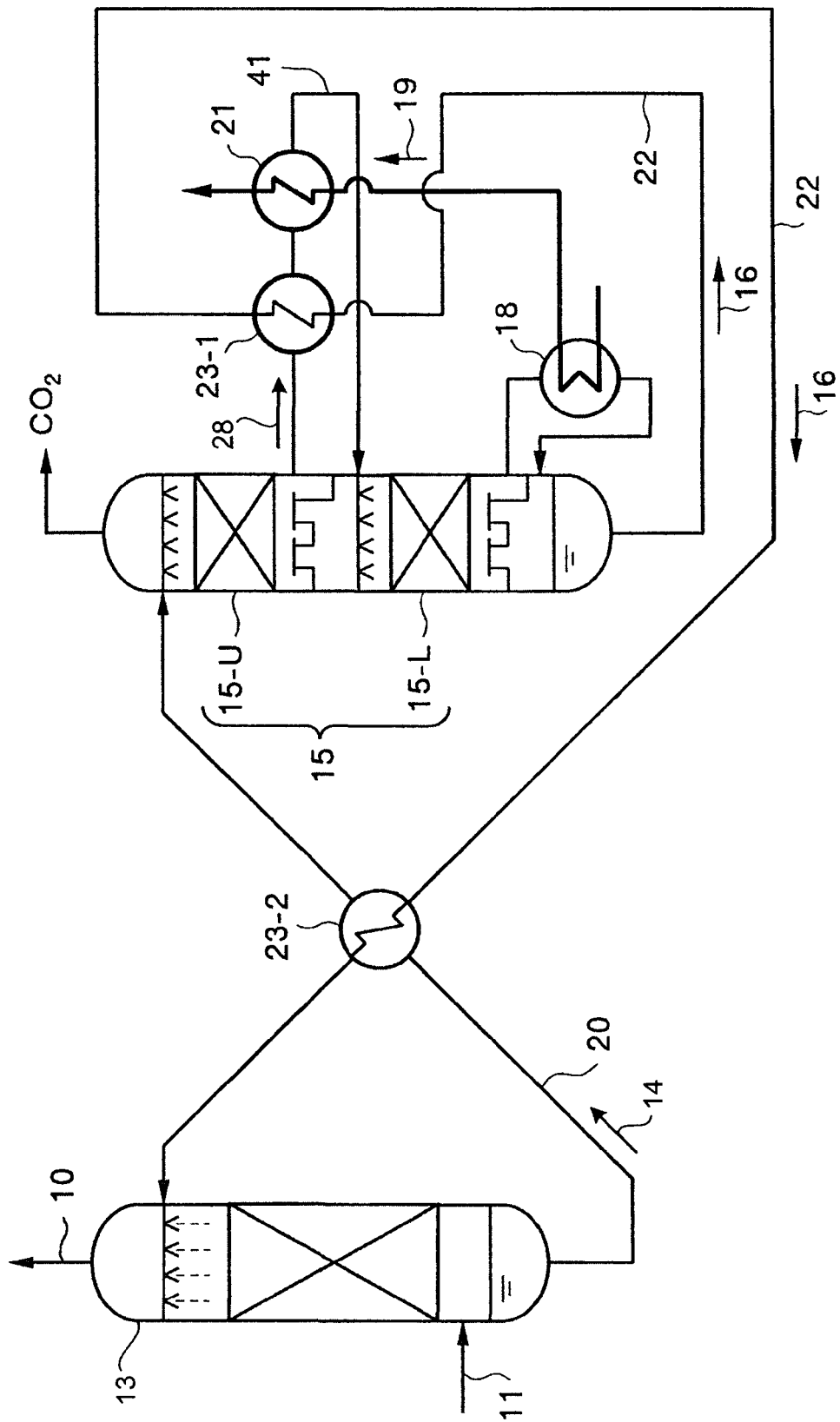
FIG. 8 is a schematic of a $CO_2$ recovery system according to a eighth embodiment.

FIG. 8 is a schematic of a CO2 recovery system according to an eighth embodiment.

Components the same as those in each of the CO2 recovery systems according to the first to the seventh embodiments are assigned with the same reference numerals, and explanation thereof is omitted.

As shown in FIG. 8, the CO2 recovery system according to the eighth embodiment of the present invention includes the upper-portion regeneration tower 15-U and the lower-portion regeneration tower 15-L, which are obtained by dividing the regeneration tower at least into two portions; the first lean-solution heat exchanger 23-1 that is interposed in the extraction pipe 41 for extracting the semi-lean solution 28, obtained by removing part of CO2 from the rich solution, from the upper-portion regeneration tower 15-U divided, and heats the semi-lean solution 28 with the residual heat of the lean solution 16 that flows through the lean-solution supply pipe 22; and the steam-condensate heat exchanger 21 that is provided in the downstream side of and adjacent to the first lean-solution heat exchanger 23-1 in the extraction pipe 41, and reheats the semi-lean solution 28 having been heated once, with the steam condensate 19. And the second lean-solution heat exchanger 23-2, which heats the rich solution 14 with the residual heat of the lean solution after the semi-lean solution 28 is heated, is provided in the rich-solution supply pipe 20.

In the eighth embodiment, the semi-lean solution 28 extracted from the upper-portion regeneration tower 15-U is heated in the first lean-solution heat exchanger 23-1, and further heated in the steam-condensate heat exchanger 21, and the residual heat of the steam condensate 19 having been used in the regeneration heater 18 is thereby effectively used. As a result, the supply amount of steam to be used in the regeneration tower 15 can be reduced.

Furthermore, when the inside of the regeneration tower is divided into a plurality of stages and the semi-lean solution 28, extracted from each stage of the regeneration tower divided, is returned to the regeneration tower on the lower stage side, the semi-lean solution 28 is heat-exchanged in the lean-solution heat exchanger and the steam-condensate heat exchanger respectively. This causes the temperature of the semi-lean solution 28, which is regenerated in the regeneration tower 15, to be increased, and consequently, the supply amount of steam to be used in the regeneration tower 15 can be reduced.

Ninth Embodiment

Figure 9:
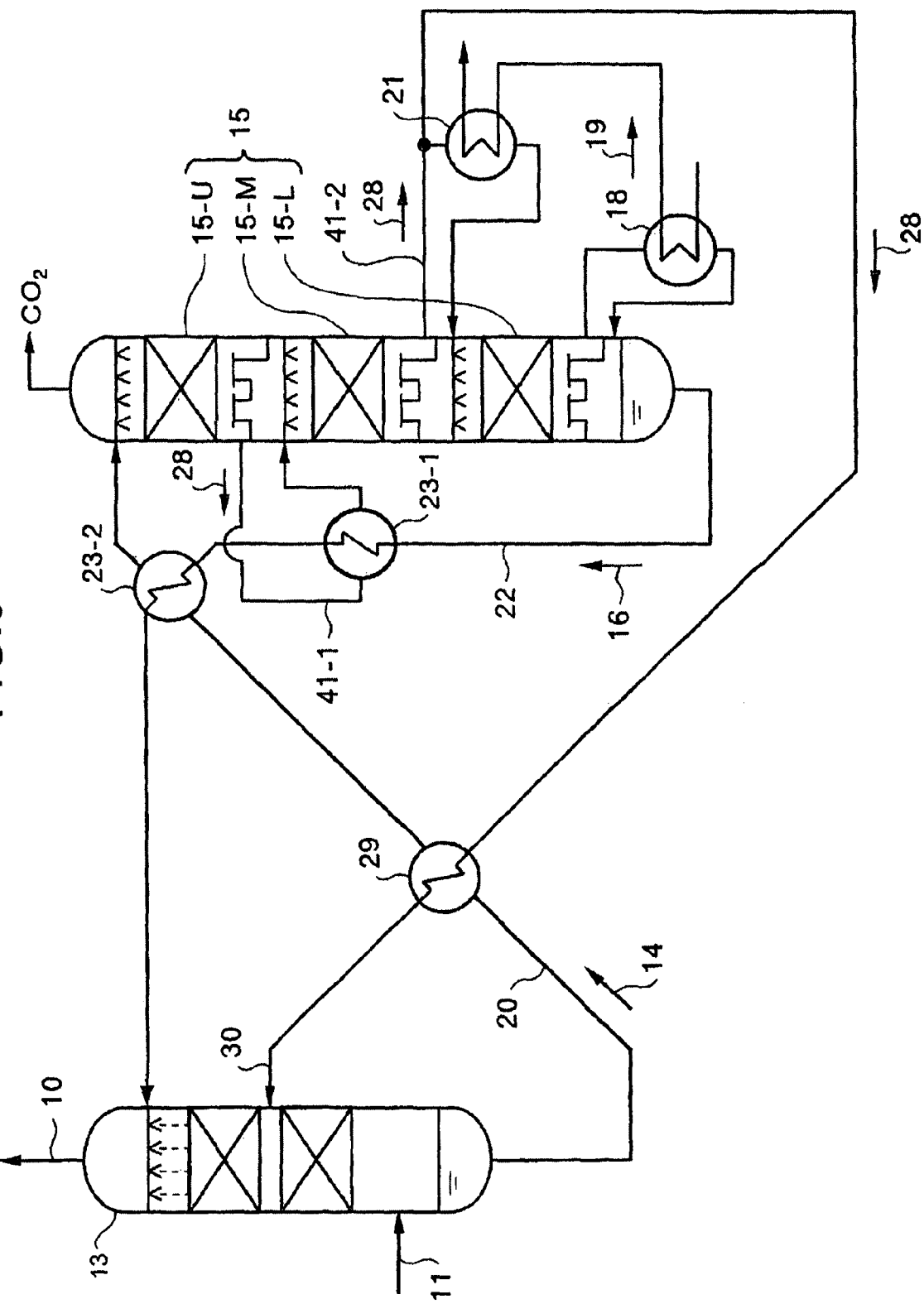
FIG. 9 is a schematic of a $CO_2$ recovery system according to a ninth embodiment.

FIG. 9 is a schematic of a CO2 recovery system according to a ninth embodiment.

Components the same as those in each of the CO2 recovery systems according to the first to the eighth embodiments are assigned with the same reference numerals, and explanation thereof is omitted.

As shown in FIG. 9, the CO2 recovery system according to the ninth embodiment of the present invention includes the upper-portion regeneration tower 15-U, the middle-portion regeneration tower 15-M, and the lower-portion regeneration tower 15-L, which are obtained by dividing the regeneration tower 15 into three: upper, middle, and lower portions; the first lean-solution heat exchanger 23-1 that heats the semi-lean solution 28, obtained by removing part of CO2 from the rich solution and extracted from the upper-portion regeneration tower 15-U through a first extraction pipe 41-1, with the lean solution fed from the regeneration tower; the steam-condensate heat exchanger 21 that heats the semi-lean solution 28, obtained by removing part of $CO_2$ from the rich solution and extracted from the middle-portion regeneration tower 15-M through a second extraction pipe 41-2, with the steam condensate; the semi-lean-solution heat exchanger 29 that is provided in the rich-solution supply pipe 20, and heats the rich solution 14 with the part of the semi-lean solution 28 extracted from the middle-portion regeneration tower 15-M; and the second lean-solution heat exchanger 23-2 that is provided in the downstream side of the semi-lean-solution heat exchanger 29 in the rich-solution supply pipe 20, and heats the rich solution 14 with the residual heat of the lean solution 16 after the semi-lean solution 28 is heated. And the semi-lean solution heated is supplied to the lower stage side of the regeneration tower, and the semi-lean solution 28 after heat exchange is performed in the semi-lean-solution heat exchanger 29 is supplied to the middle stage portion of the absorption tower 13 through the semi-lean-solution supply pipe 30.

In the ninth embodiment, the semi-lean solution 28 respectively extracted from the upper-portion regeneration tower 15-U and the middle-portion regeneration tower 15-M is heated in the first lean-solution heat exchanger 23-1 or in the steam-condensate heat exchanger 21, and the residual heat of the lean solution 16 and of the steam condensate 19 is thereby effectively used. As a result, the supply amount of steam to be used in the regeneration tower 15 can be reduced.

The residual heat of the semi-lean solution 28 after heat exchange is performed in the steam-condensate heat exchanger 21 is used for heating the rich solution, and the residual heat of the lean solution heat-exchanged in the first lean-solution heat exchanger 23-1 is used for heating the rich solution in the second lean-solution heat exchanger 23-2. It is thereby possible to increase the temperature of the rich solution 14 to be supplied to the regeneration tower 15, and as a result, the supply amount of steam to be used in the regeneration tower 15 can be reduced.

The exemplary examples indicating the effect of the present invention are explained below, but the present invention is not limited by the examples.

Example 1

A $CO_2$ recovery system according to example 1 of the present invention is explained below with reference to the following drawing.

Figure 10:
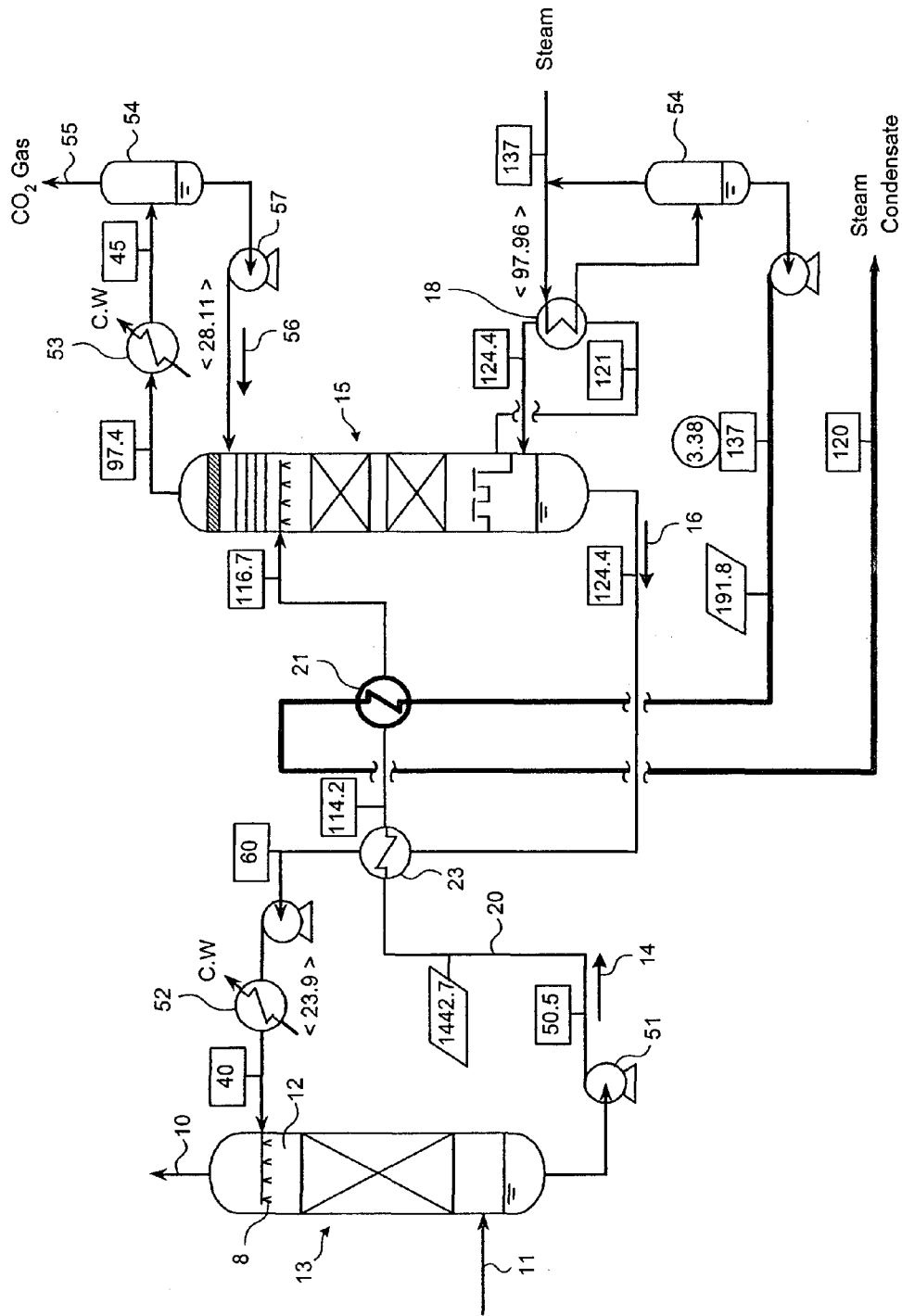
FIG. 10 is a schematic of a $CO_2$ recovery system according to example 1.

FIG. 10 is a schematic of the $CO_2$ recovery system according to example 1.

As shown in FIG. 10, the $CO_2$-containing exhaust gas 11 supplied to the $CO_2$ absorption tower 13 is brought into countercurrent contact with the absorbing solution 12 in a filling portion, the absorbing solution 12 having predetermined concentration and being supplied from the nozzle 8. $CO_2$ in the combustion exhaust gas is absorbed and removed by the $CO_2$-absorbing solution 12, and the remaining $CO_2$-removed exhaust gas 10, from which $CO_2$ has been absorbed and removed, is fed to the outside. The absorbing solution 12 supplied to the $CO_2$ absorption tower 13 absorbs $CO_2$, and reaction heat due to the absorption causes the temperature of the absorbing solution 12 to become higher than normal temperature in a tower head. The absorbing solution having absorbed $CO_2$ is sent by a discharge pump 51 for the absorbing solution, as the rich solution 14, to the lean-solution heat exchanger 23 and the steam-condensate heat exchanger 21, where it is heated, to be introduced into the regeneration tower 15.

In the regeneration tower 15, the absorbing solution is regenerated by being heated with the steam 17 by the regeneration heater 18, cooled as the lean solution 16 by the lean-solution heat exchanger 23 and a cooler 52 provided as necessary, and is returned to the $CO_2$ absorption tower 13. In the upper portion of the regeneration tower 15, $CO_2$ separated from the absorbing solution is cooled by a regeneration-tower reflux condenser 53, the steam associated with $CO_2$ is separated from condensed reflux water in a $CO_2$ separator 54, and output to the outside of the system through a recovered-$CO_2$ discharge line 55. Reflux water 56 is flowed back to the regeneration tower 15 by a reflux pump 57.

In the example 1, the steam used in the regeneration heater 18 is introduced into a separator to be flashed, and the residual heat of the steam flashed as the steam condensate 19 is used for heating the rich solution 14 in the steam-condensate heat exchanger 21.

Figure 22:
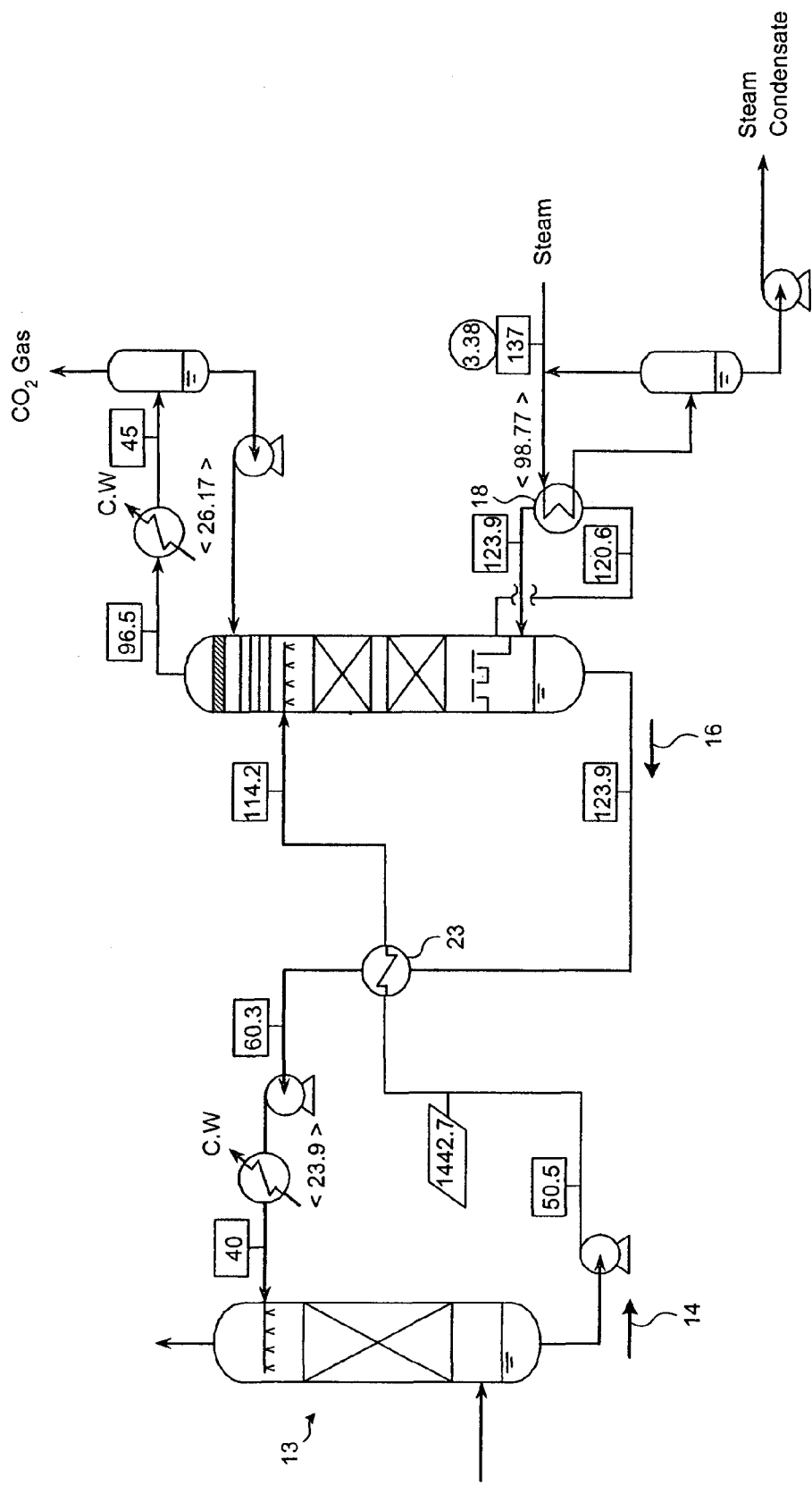
FIG. 22 is a schematic of a CO2 recovery system according to a conventional example.

As a comparison, the case where the steam-condensate heat exchanger 21 is not provided is shown in FIG. 22.

If the temperature of the rich solution 14 to be discharged from the absorption tower 13 was 50.5° C., the temperature was 114.2° C. when only the lean-solution heat exchanger 23 was provided, while in the example 1, the steam-condensate heat exchanger 21 was provided, and the temperature thereby increased to 116.7° C., consequently, the amount of steam consumed in the regeneration tower 15 became 97.96 MMkcal/h.

In FIG. 10, temperature (° C.) is surrounded by a rectangle, flow rate (t/h) is surrounded by a parallelogram, and the amount of heat (MMkcal/h) is represented with angled brackets. The same goes for FIG. 11 to FIG. 21.

The amount of steam consumed in the comparative example of FIG. 22 was 98.77 MMkcal/h. Assuming the comparative example is 100, the amount of steam consumed in this example becomes 99.2%. Therefore, the reduction rate of specific steam consumption (improvement effect) was 0.8%.

Example 2

A $CO_2$ recovery system according to example 2 of the present invention is explained below with reference to the following drawing.

Figure 11:
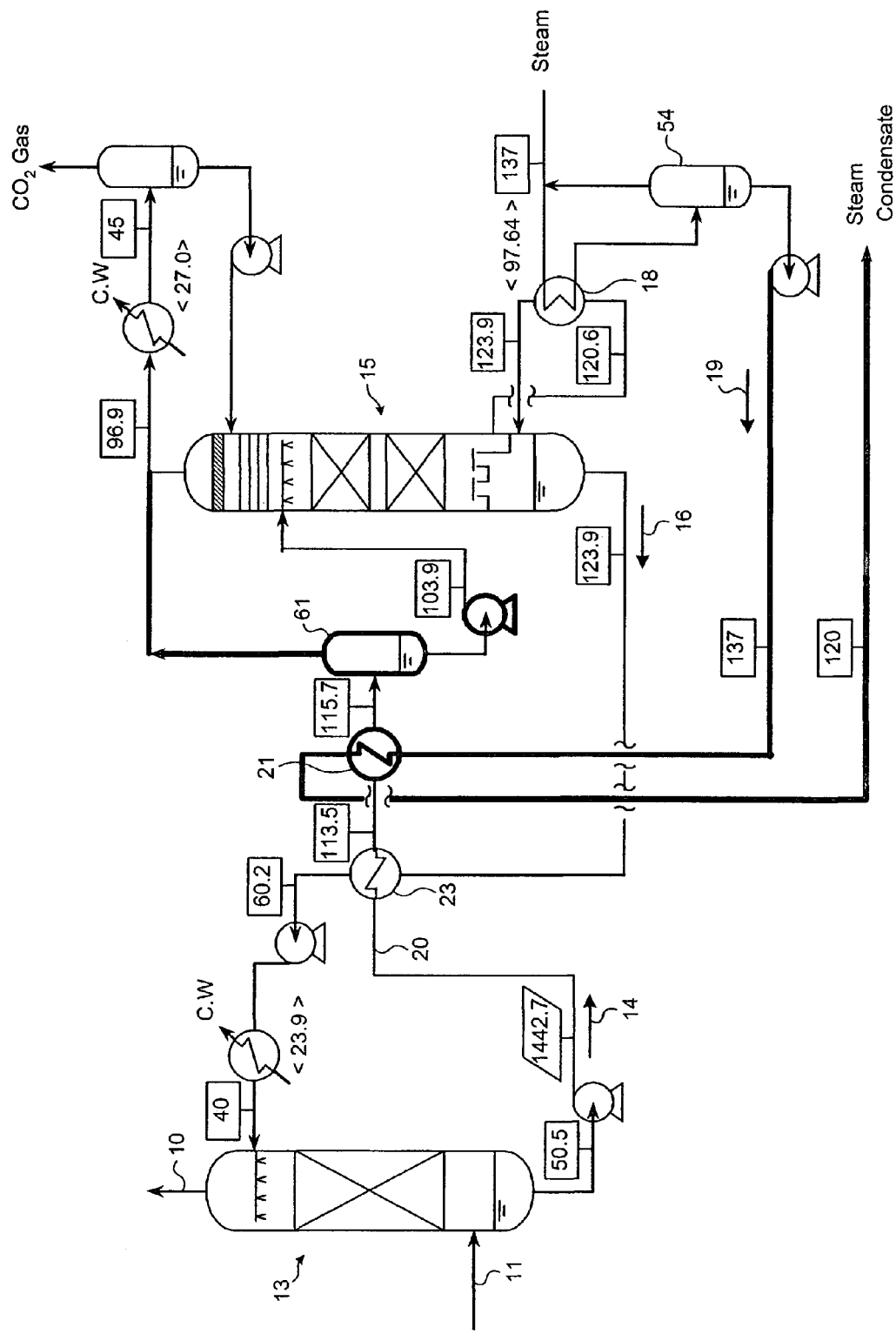
FIG. 11 is a schematic of a $CO_2$ recovery system according to example 2.

FIG. 11 is a schematic of the $CO_2$ recovery system according to example 2. Components the same as those of example 1 are assigned with the same reference numerals and explanation thereof is omitted.

In example 2, a flash drum 61 is provided in the downstream side of the steam-condensate heat exchanger 21 that heats the rich solution 14. In the upstream side of the flash drum 61, the rich solution 14 is heated in the steam-condensate heat exchanger 21, and therefore, $CO_2$ in the rich solution 14 can be removed in the flash drum 61.

The temperature of the rich solution fed from the flash drum 61 is 103.9° C., but because part of $CO_2$ has been removed, decreasing inlet temperature of the regeneration tower 15 causes the steam discharged from the tower head to be reduced, which is preferable.

In example 2, as the result, the amount of steam consumed in the regeneration tower 15 became 97.64 MMkcal/h. Assuming the comparative example is 100, the amount of steam consumed in this example becomes 98.9%. Therefore, the reduction rate of specific steam consumption (improvement effect) was 1.1%.

Example 3

A CO2 recovery system according to example 3 of the present invention is explained below with reference to the following drawing.

Figure 12:
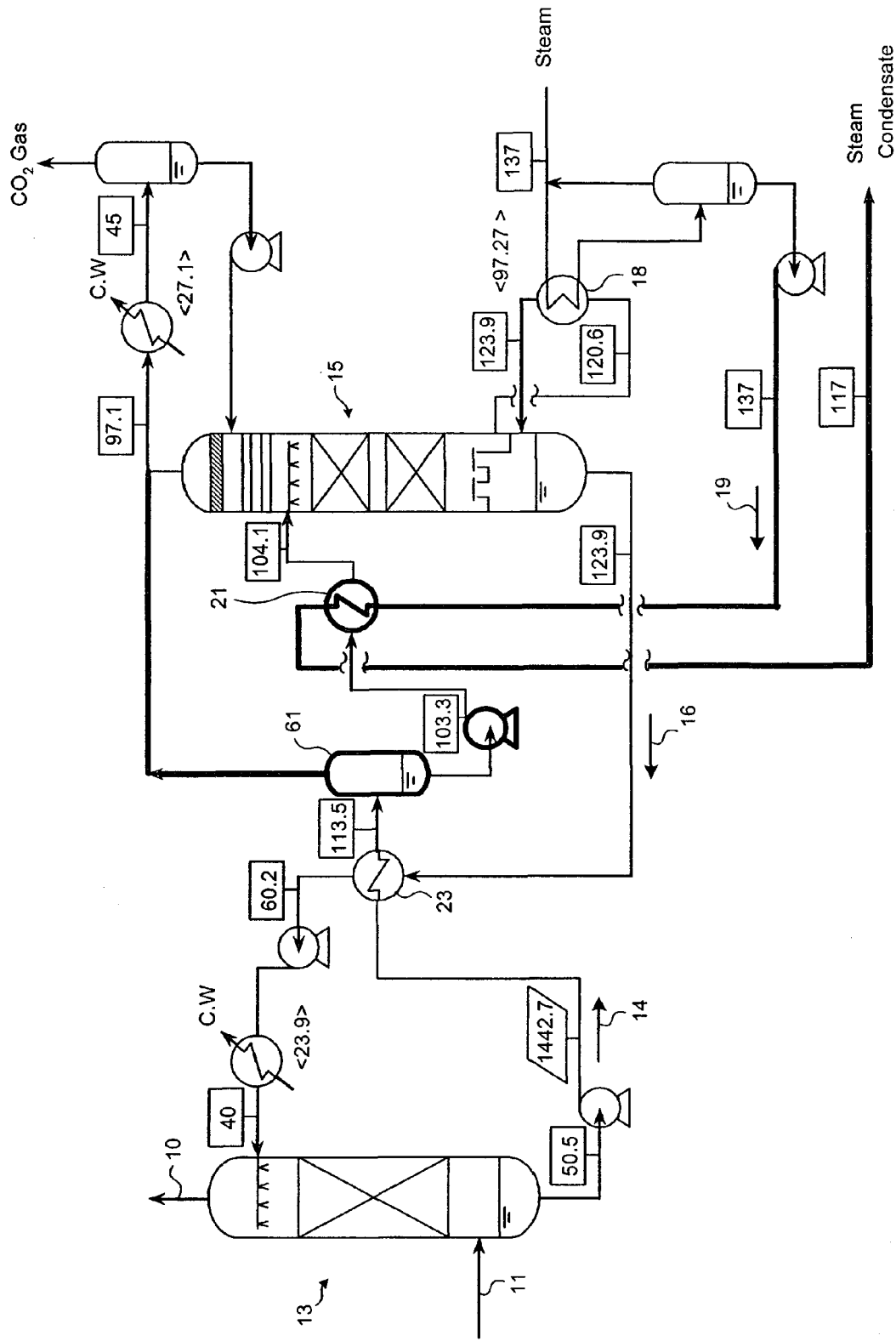
FIG. 12 is a schematic of a $CO_2$ recovery system according to example 3.

FIG. 12 is a schematic of the CO2 recovery system according to example 3. Components the same as those of example 1 are assigned with the same reference numerals and explanation thereof is omitted.

In example 3, the flash drum 61 is provided in the upstream side of the steam-condensate heat exchanger 21 that heats the rich solution 14. In the downstream side of the flash drum 61, the rich solution 14 was heated in the steam-condensate heat exchanger 21, to thereby increase the temperature of the rich solution 14 to be supplied to the regeneration tower 15.

In example 3, as the result, the amount of steam consumed in the regeneration tower 15 became 97.27 MMkcal/h. Assuming the comparative example is 100, the amount of steam consumed in this example becomes 98.5%. Therefore, the reduction rate of specific steam consumption (improvement effect) was 1.5%.

Example 4

A CO2 recovery system according to example 4 of the present invention is explained below with reference to the following drawing.

Figure 13:
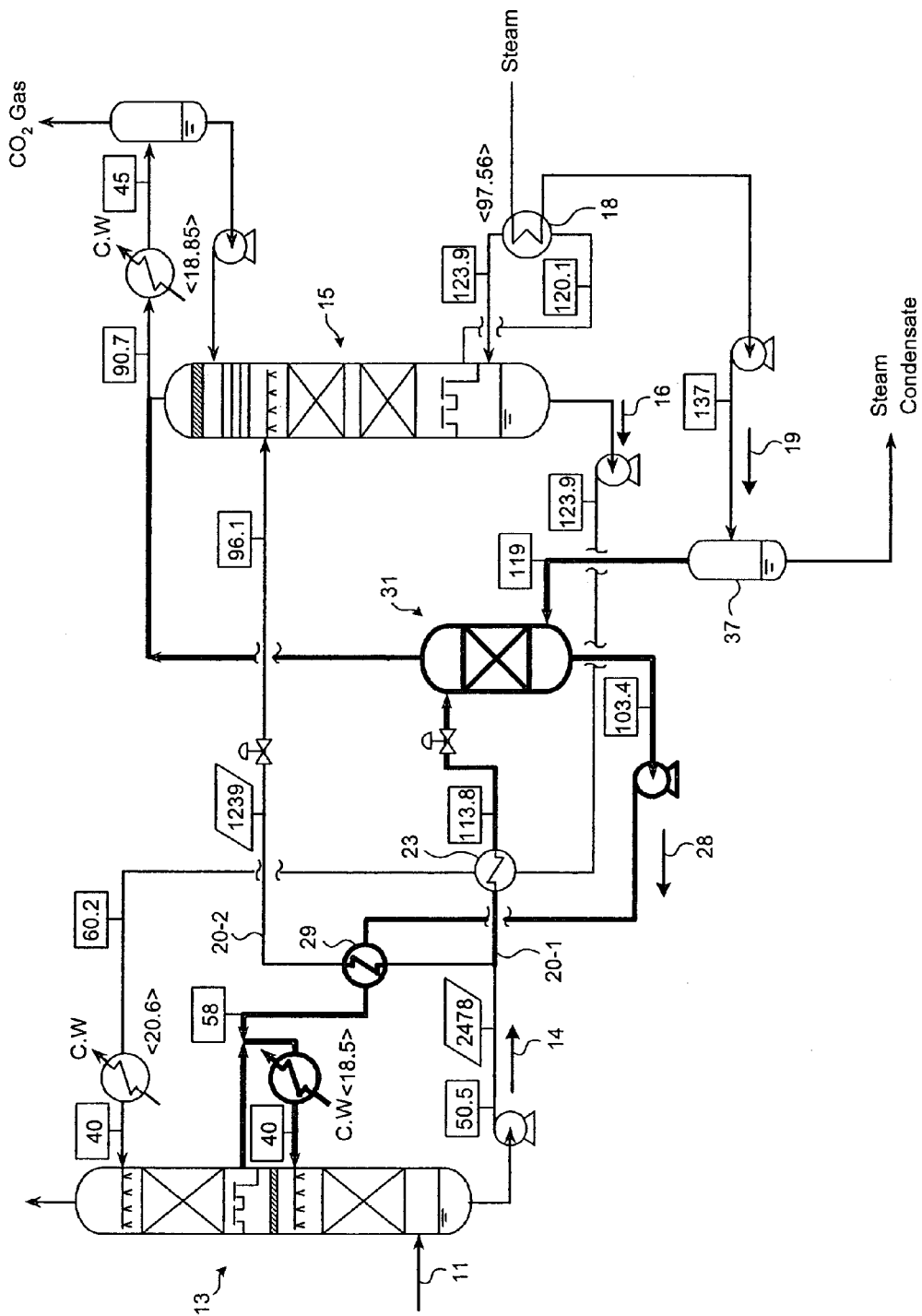
FIG. 13 is a schematic of a $CO_2$ recovery system according to example 4.

FIG. 13 is a schematic of the CO2 recovery system according to example 4. Components the same as those of example 1 are assigned with the same reference numerals and explanation thereof is omitted.

In example 4, the rich solution 14 was divided, part of the rich solution 14 divided was sent to the heat exchanger 31 of flash drum type, where the rich solution 14 was heat-exchanged with the steam from the steam condensate and CO2 was removed from the rich solution 14. Using the residual heat of the semi-lean solution 28 after the heat exchange, the other part of the rich solution 14 divided was heat-exchanged in the semi-lean-solution heat exchanger 29, to increase the temperature of the rich solution 14 to be supplied to the regeneration tower 15.

In example 4, as the result, the amount of steam consumed in the regeneration tower 15 became 97.56 MMkcal/h. Assuming the comparative example is 100, the amount of steam consumed in this example becomes 98.8%. Therefore, the reduction rate of specific steam consumption (improvement effect) was 1.2%.

Example 5

A CO2 recovery system according to example 5 of the present invention is explained below with reference to the following drawing.

Figure 14:
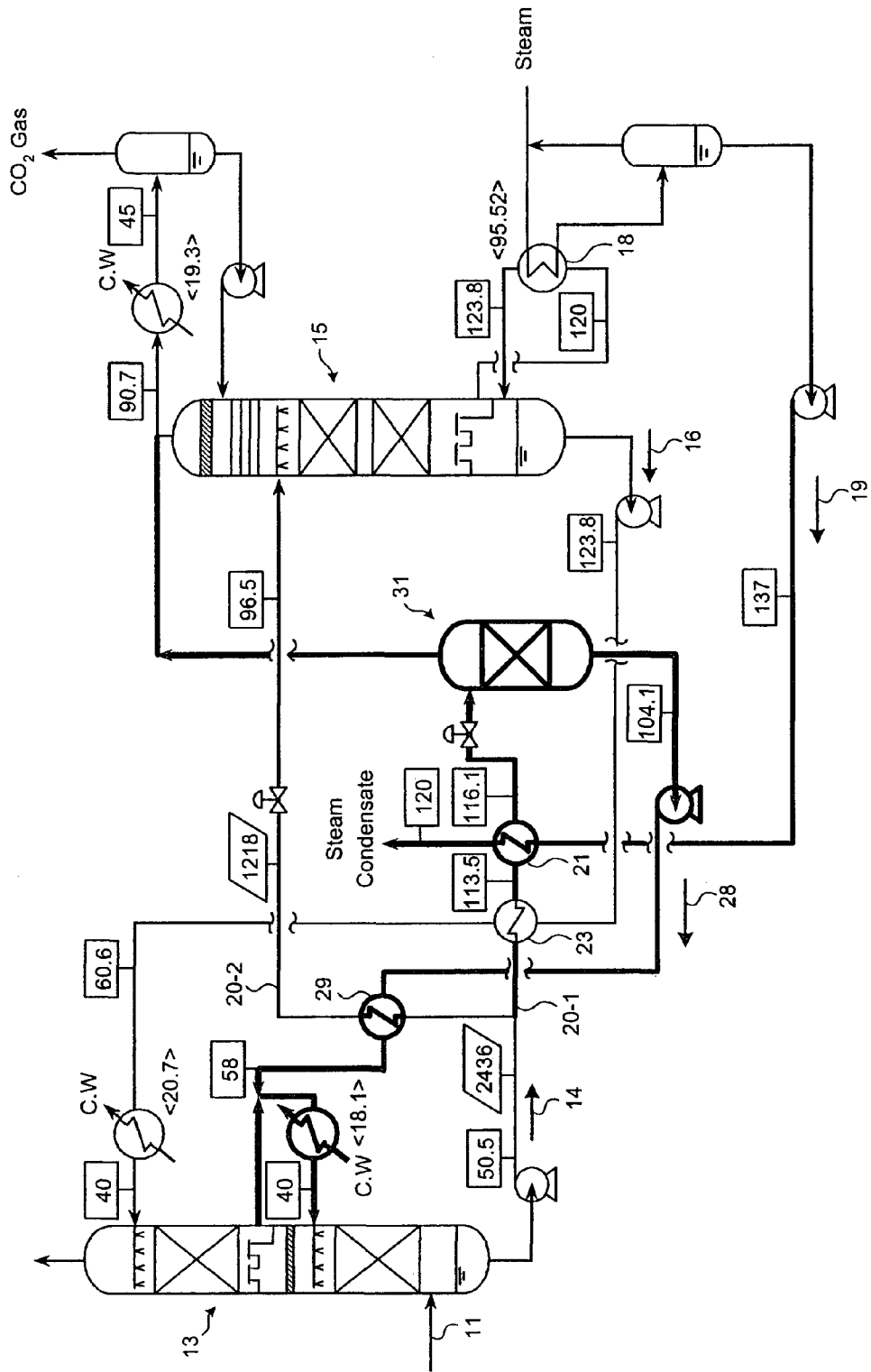
FIG. 14 is a schematic of a $CO_2$ recovery system according to example 5.

FIG. 14 is a schematic of the CO2 recovery system according to example 5. Components the same as those of example 1 are assigned with the same reference numerals and explanation thereof is omitted.

In example 5, the rich solution 14 was divided, and part of the rich solution 14 divided was sent to the heat exchanger 31 of flash drum type, but on the way to the heat exchanger 31, the rich solution 14 was heat-exchanged with the residual heat of the steam condensate in the steam-condensate heat exchanger 21, to improve the removal rate of CO2 from the rich solution 14 in the flash drum 31. Using the residual heat of the semi-lean solution 28 after the heat exchange, the other part of the rich solution 14 divided was heat-exchanged in the semi-lean-solution heat exchanger 29, to thereby increase the temperature of the rich solution 14 to be supplied to the regeneration tower 15.

In example 5, as the result, the amount of steam consumed in the regeneration tower 15 became 95.52 MMkcal/h. Assuming the comparative example is 100, the amount of steam consumed in this example becomes 96.7%. Therefore, the reduction rate of specific steam consumption (improvement effect) was 3.3%.

Example 6

A CO2 recovery system according to example 6 of the present invention is explained below with reference to the following drawing.

Figure 15:
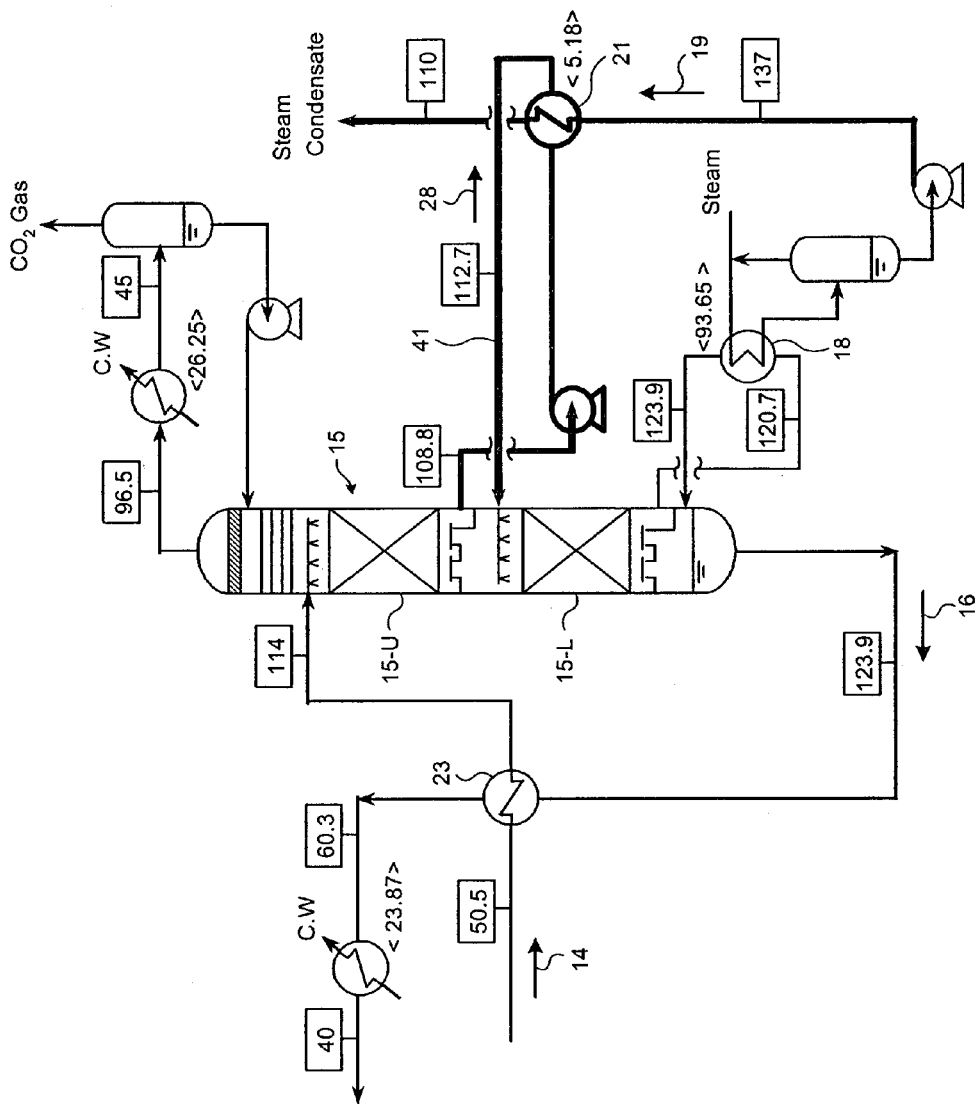
FIG. 15 is a schematic of a $CO_2$ recovery system according to example 6.

FIG. 15 is a schematic of the CO2 recovery system according to example 6. Components the same as those of example 1 are assigned with the same reference numerals and explanation thereof is omitted.

In example 6, the regeneration tower 15 was divided into two portions, the semi-lean solution 28 extracted from the upper-portion regeneration tower 15-U was heat-exchanged with the residual heat of the steam condensate 19 in the steam-condensate heat exchanger 21, and the semi-lean solution 28 heat-exchanged was returned to the lower-portion regeneration tower 15-L. This caused an increase in the temperature of the semi-lean solution to be supplied to the lower portion side of the regeneration tower 15.

In example 6, as the result, the amount of steam consumed in the regeneration tower 15 became 93.65 MMkcal/h. Assuming the comparative example is 100, the amount of steam consumed in this example becomes 94.8%. Therefore, the reduction rate of specific steam consumption (improvement effect) was 5.2%.

Example 7

A CO2 recovery system according to example 7 of the present invention is explained below with reference to the following drawing.

Figure 16:
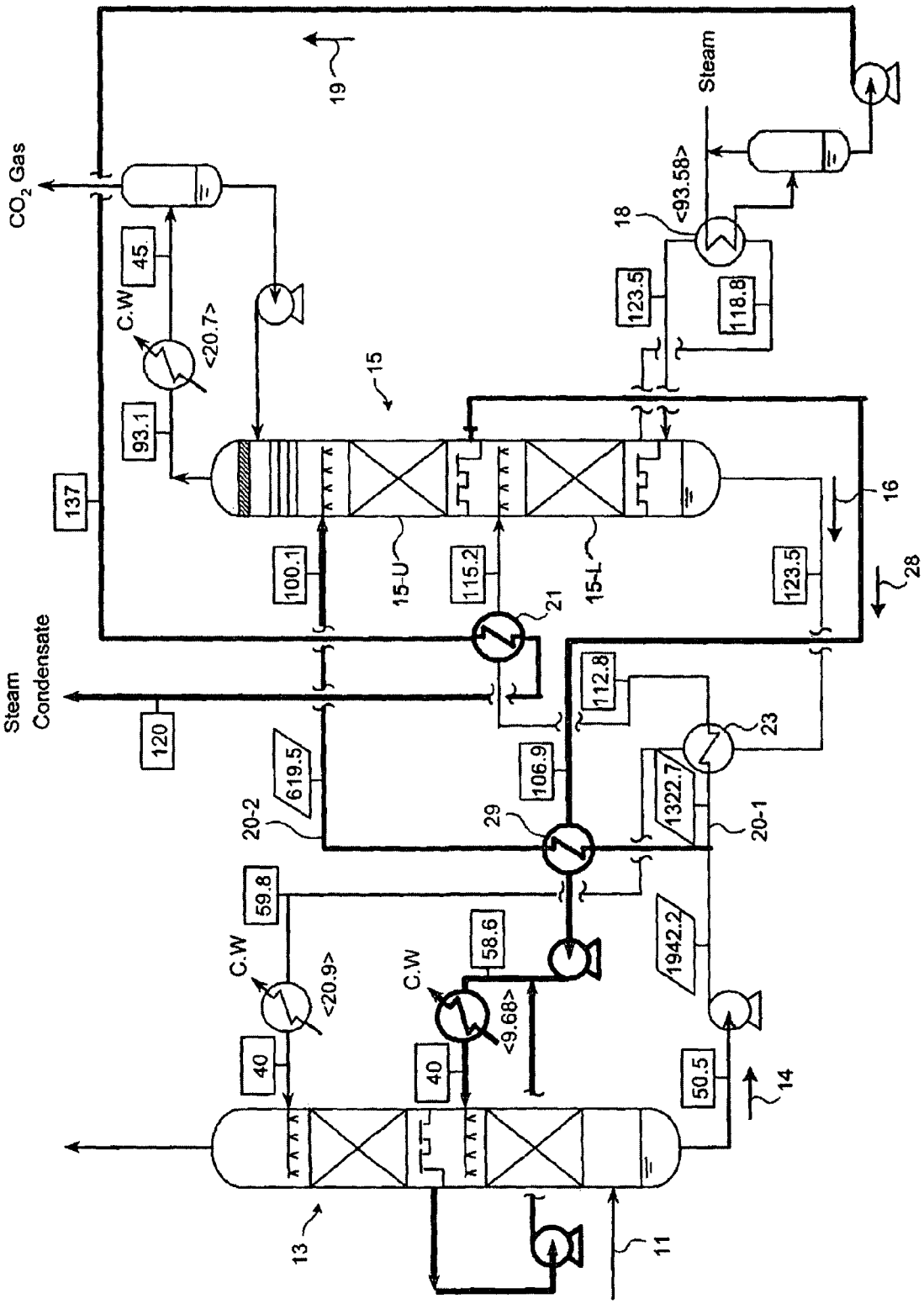
FIG. 16 is a schematic of a $CO_2$ recovery system according to example 7.

FIG. 16 is a schematic of the CO2 recovery system according to example 7. Components the same as those of example 1 are assigned with the same reference numerals and explanation thereof is omitted.

In example 7, the regeneration tower 15 was divided into two portions, and the rich solution 14 was divided. The lean-solution heat exchanger 23 was provided in the first rich-solution supply pipe 20-1, and in the downstream side thereof, the steam-condensate heat exchanger 21 was provided, to thereby increase the temperature of the rich solution 14 to be supplied to the lower-portion regeneration tower 15-L. Furthermore, the semi-lean-solution heat exchanger 29, which uses the residual heat of the semi-lean solution 28 fed from the upper-portion regeneration tower 15-U, was provided in the second rich-solution supply pipe 20-2, to thereby increase the temperature of the rich solution to be supplied to the upper-portion regeneration tower 15-U.

The ratio of division of the rich solution 14 is such that the first rich solution was set to 70% and the second rich solution was set to 30%.

In example 7, as the result, the amount of steam consumed in the regeneration tower 15 became 93.58 MMkcal/h. Assuming the comparative example is 100, the amount of steam consumed in this example becomes 94.8%. Therefore, the reduction rate of specific steam consumption (improvement effect) was 5.2%.

Example 8

A CO2 recovery system according to example 8 of the present invention is explained below with reference to the following drawing.

Figure 17:
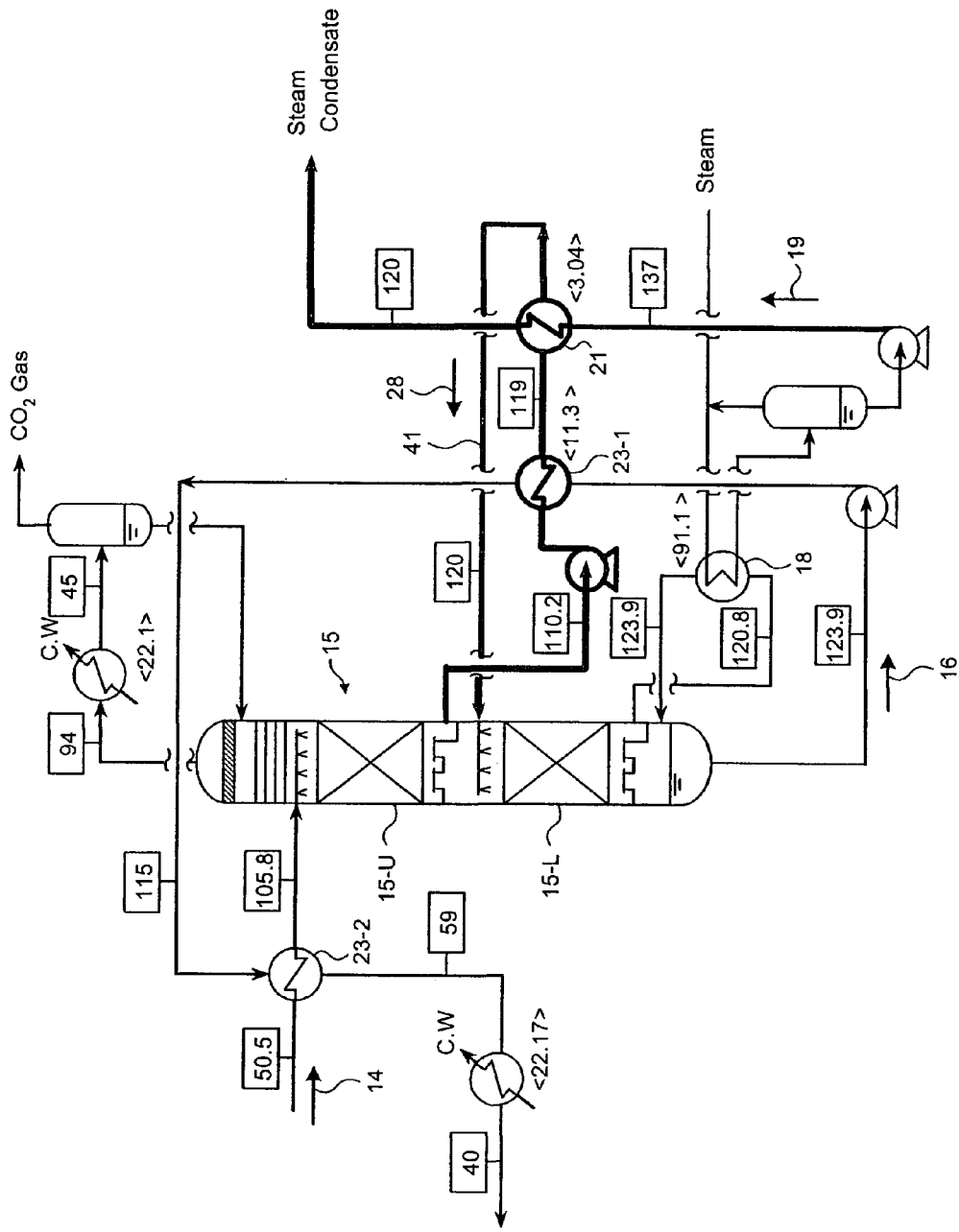
FIG. 17 is a schematic of a $CO_2$ recovery system according to example 8.

FIG. 17 is a schematic of the CO2 recovery system according to example 8. Components the same as those of example 1 are assigned with the same reference numerals and explanation thereof is omitted.

In example 8, the regeneration tower 15 was divided into two portions, and the semi-lean solution 28 extracted from the upper-portion regeneration tower 15-U was first heat-exchanged in the first lean-solution heat exchanger 23-1, and then, was heat-exchanged with the residual heat of the steam condensate 19 in the steam-condensate heat exchanger 21, and the semi-lean solution 28 heat-exchanged was returned to the lower-portion regeneration tower 15-L. This caused an increase in the temperature of the semi-lean solution to be supplied to the lower portion side of the regeneration tower 15.

In example 8, as the result, the amount of steam consumed in the regeneration tower 15 became 91.1 MMkcal/h. Assuming the comparative example is 100, the amount of steam consumed in this example becomes 92.3%. Therefore, the reduction rate of specific steam consumption (improvement effect) was 7.7%.

Example 9

A CO2 recovery system according to example 9 of the present invention is explained below with reference to the following drawing.

Figure 18:
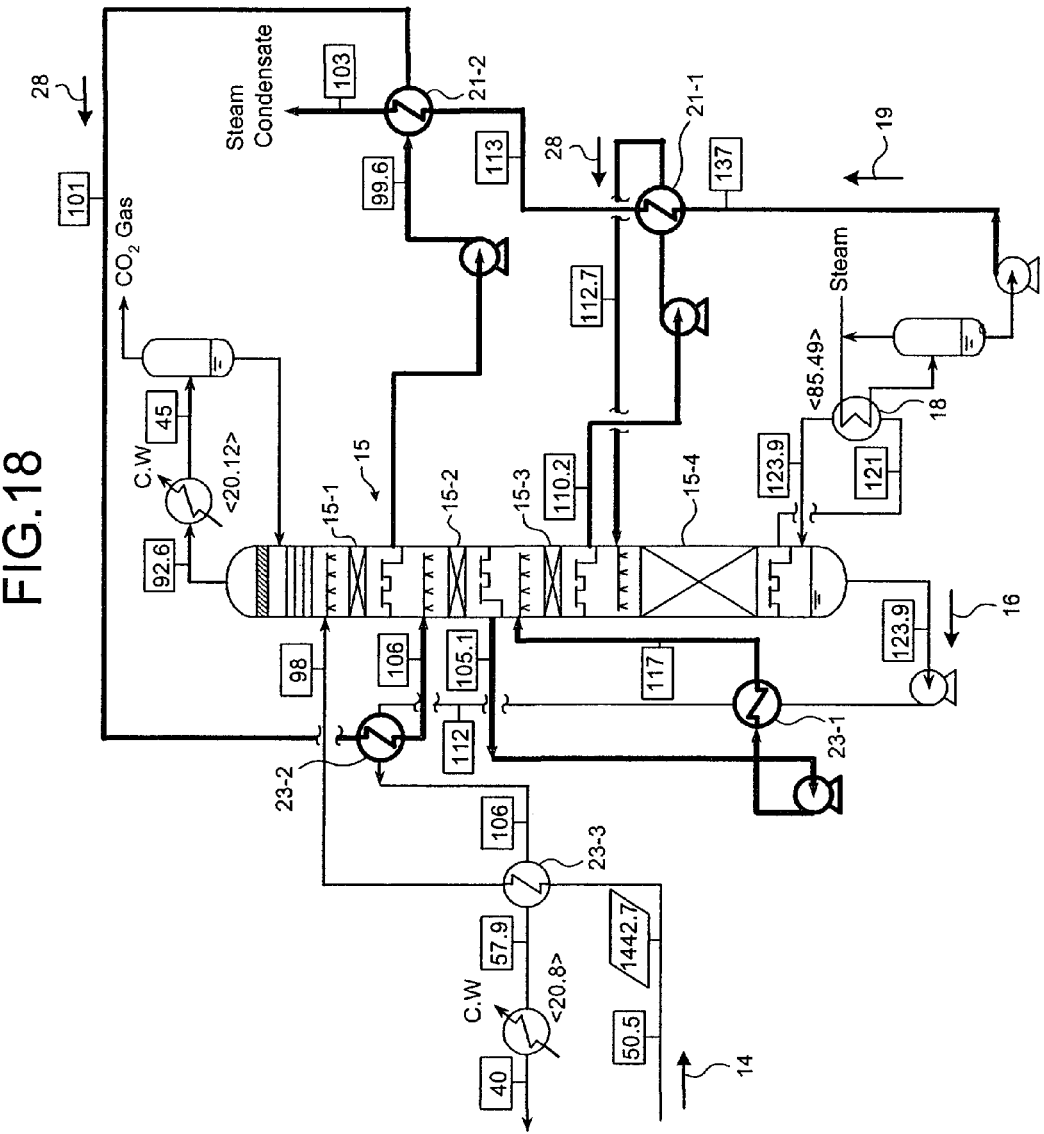
FIG. 18 is a schematic of a $CO_2$ recovery system according to example 9.

FIG. 18 is a schematic of the CO2 recovery system according to example 9. Components the same as those of example 1 are assigned with the same reference numerals and explanation thereof is omitted.

In example 9, the regeneration tower 15 was divided into four portions such as a first regeneration tower 15-1, a second regeneration tower 15-2, a third regeneration tower 15-3, and a fourth regeneration tower 15-4. The semi-lean solution 28 respectively extracted from the first regeneration tower 15-1 and the third regeneration tower 15-3 was heat-exchanged with the respective residual heat of the steam condensate in a first steam-condensate heat exchanger 21-1 and a second steam-condensate heat exchanger 21-2, respectively. Because the temperature in the lower portion side of the regeneration tower was high, the residual heat of the steam condensate 19 was effectively used.

Furthermore, the semi-lean solution extracted from the second regeneration tower 15-2 was heat-exchanged with the residual heat of the lean solution 16 in the first lean-solution heat exchanger 23-1. The semi-lean solution 28 extracted from the first regeneration tower 15-1, before being returned to the second regeneration tower 15-2 in the lower stage side, was heat-exchanged in the second lean-solution heat exchanger 23-2 in which the semi-lean solution 28 was heat-exchanged with the residual heat of the lean solution 16 that had been heat-exchanged in the first lean-solution heat exchanger 23-1. In example 9, after the heat exchange, the rich solution 14 fed from the absorption tower 13 was heat-exchanged in a third lean-solution heat exchanger 23-3.

In example 9, as the result, the amount of steam consumed in the regeneration tower 15 became 85.49 MMkcal/h. Assuming the comparative example is 100, the amount of steam consumed in this example becomes 86.6%. Therefore, the reduction rate of specific steam consumption (improvement effect) was 13.4%.

Example 10

A CO2 recovery system according to example 10 of the present invention is explained below with reference to the following drawing.

Figure 19:
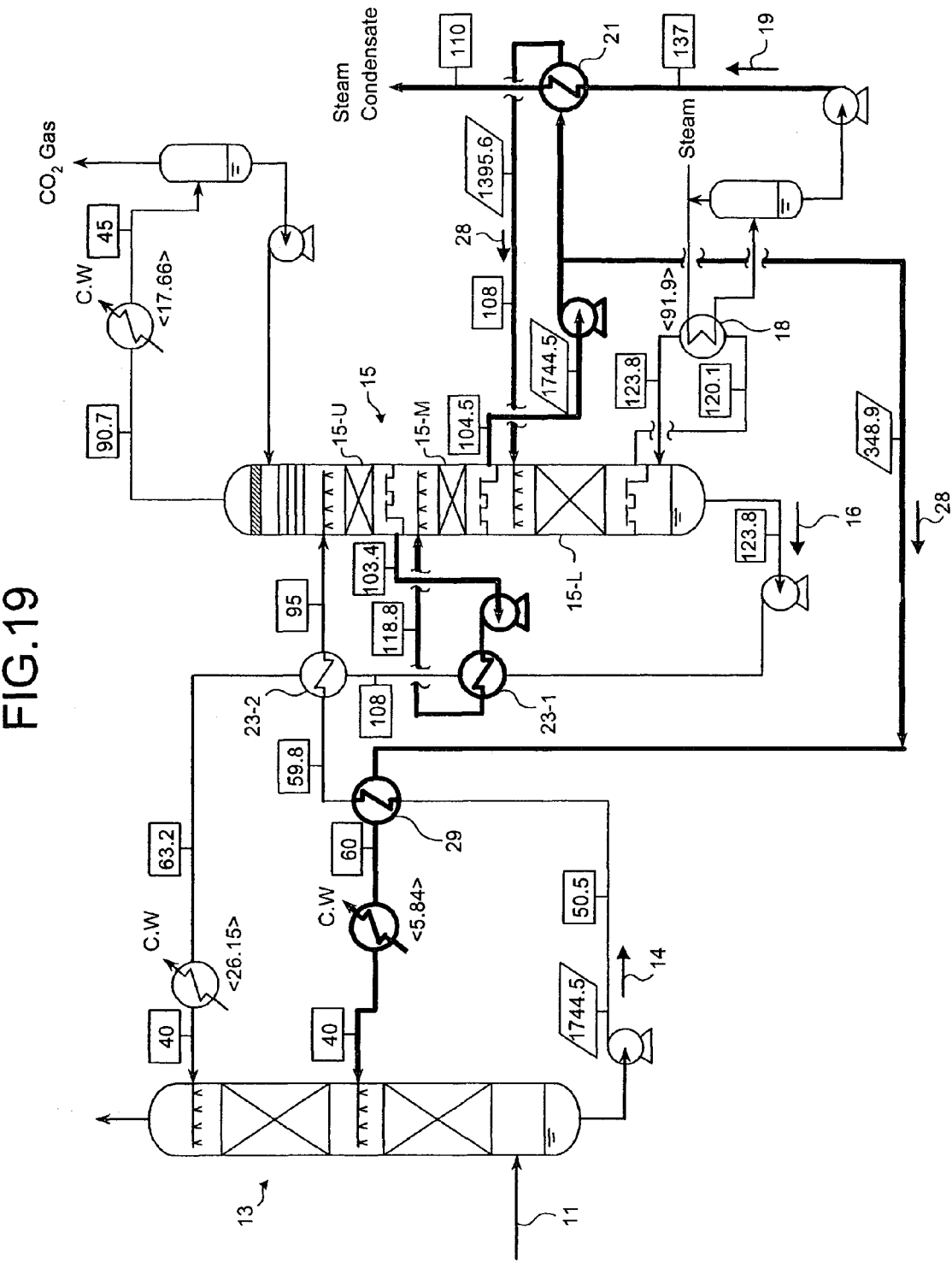
FIG. 19 is a schematic of a CO2 recovery system according to example 10.

FIG. 19 is a schematic of the CO2 recovery system according to example 10. Components the same as those of example 1 are assigned with the same reference numerals and explanation thereof is omitted.

In example 10, the regeneration tower 15 was divided into three portions such as the upper-portion regeneration tower 15-U, the middle-portion regeneration tower 15-M, and the lower-portion regeneration tower 15-L. The semi-lean solution 28 extracted from the middle-portion regeneration tower 15-M was heat-exchanged with the residual heat of the steam condensate in the steam-condensate heat exchanger 21. Part of the semi-lean solution 28 extracted was supplied to the semi-lean-solution heat exchanger 29 that heats the rich solution 14, where the residual heat of the semi-lean solution was effectively used.

Furthermore, the semi-lean solution 28 extracted from the upper-portion regeneration tower 15-U was heat-exchanged with the residual heat of the lean solution 16 in the first lean-solution heat exchanger 23-1.

The rich solution 14 heat-exchanged in the semi-lean-solution heat exchanger 29 was heat-exchanged in the second lean-solution heat exchanger 23-2 in which the rich solution 14 was heat-exchanged with the residual heat of the lean solution 16 that had been heat-exchanged in the first lean-solution heat exchanger 23-1.

In example 10, as the result, the amount of steam consumed in the regeneration tower 15 became 91.9 MMkcal/h. Assuming the comparative example is 100, the amount of steam consumed in this example becomes 93.0%. Therefore, the reduction rate of specific steam consumption (improvement effect) was 7%.

Example 11

A CO2 recovery system according to example 11 of the present invention is explained below with reference to the following drawing.

Figure 20:
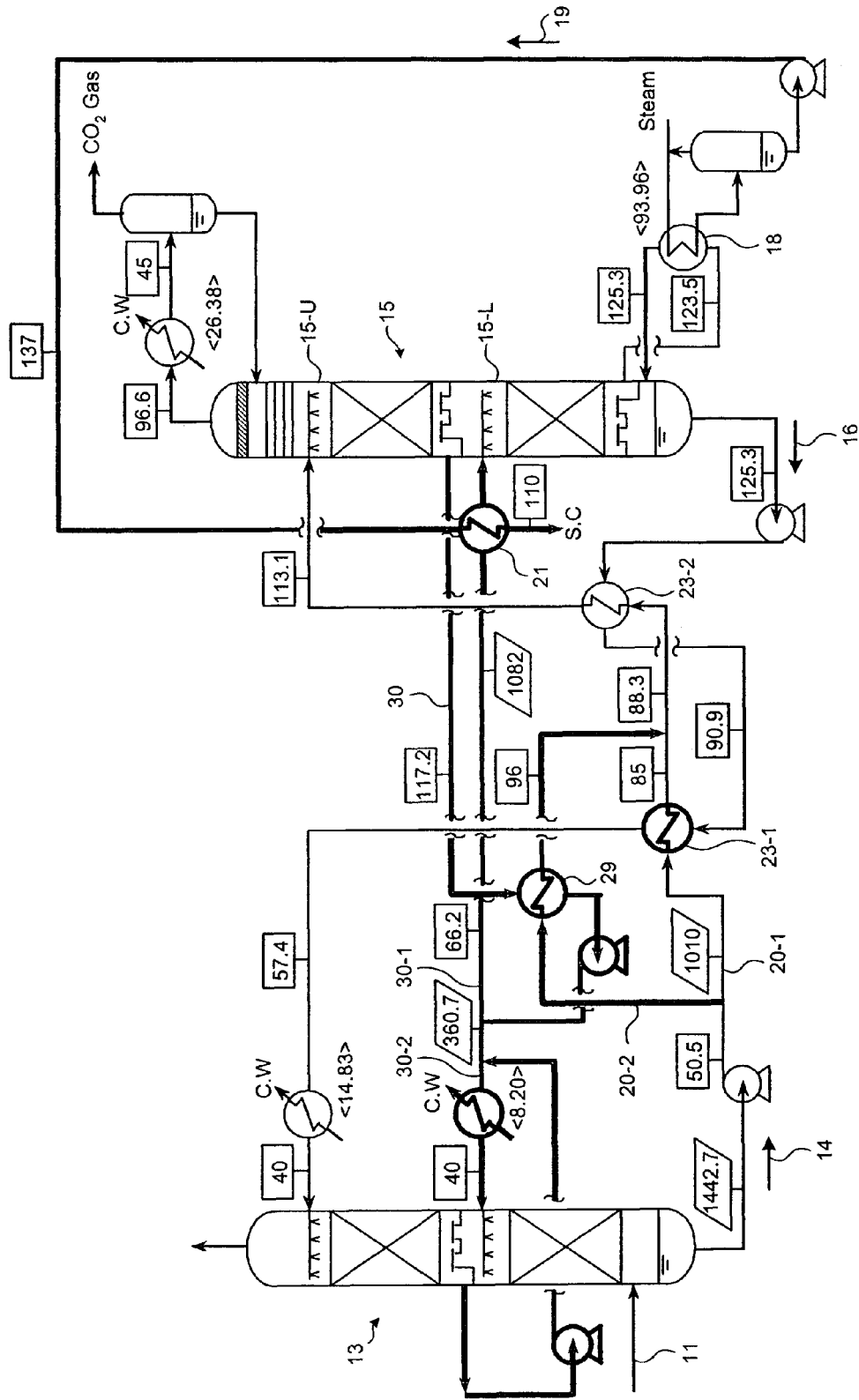
FIG. 20 is a schematic of a CO2 recovery system according to example 11.

FIG. 20 is a schematic of the CO2 recovery system according to example 11. Components the same as those of example 1 are assigned with the same reference numerals and explanation thereof is omitted.

In example 11, the regeneration tower 15 was divided into two portions such as the upper-portion regeneration tower 15-U and the lower-portion regeneration tower 15-L. The semi-lean solution 28, extracted from the upper-portion regeneration tower 15-U, was used to heat the rich solution in the second rich-solution supply pipe 20-2, in the semi-lean-solution heat exchanger 29. Thereafter, the semi-lean solution 28 was divided, to be heat-exchanged with the residual heat of the steam condensate in the steam-condensate heat exchanger 21 before being supplied to the lower-portion regeneration tower 15-L.

The rich solution in the first rich-solution supply pipe 20-1 was heat-exchanged in the first lean-solution heat exchanger 23-1, was jointed with the other one to be heat-exchanged with the residual heat of the lean solution 16 in the second lean-solution heat exchanger 23-2, and was supplied to the regeneration tower 15.

In example 11, as the result, the amount of steam consumed in the regeneration tower 15 became 93.96 MMkcal/h. Assuming the comparative example is 100, the amount of steam consumed in this example becomes 95.1%. Therefore, the reduction rate of specific steam consumption (improvement effect) was 4.9%.

Example 12

A CO2 recovery system according to example 12 of the present invention is explained below with reference to the following drawing.

Figure 21:
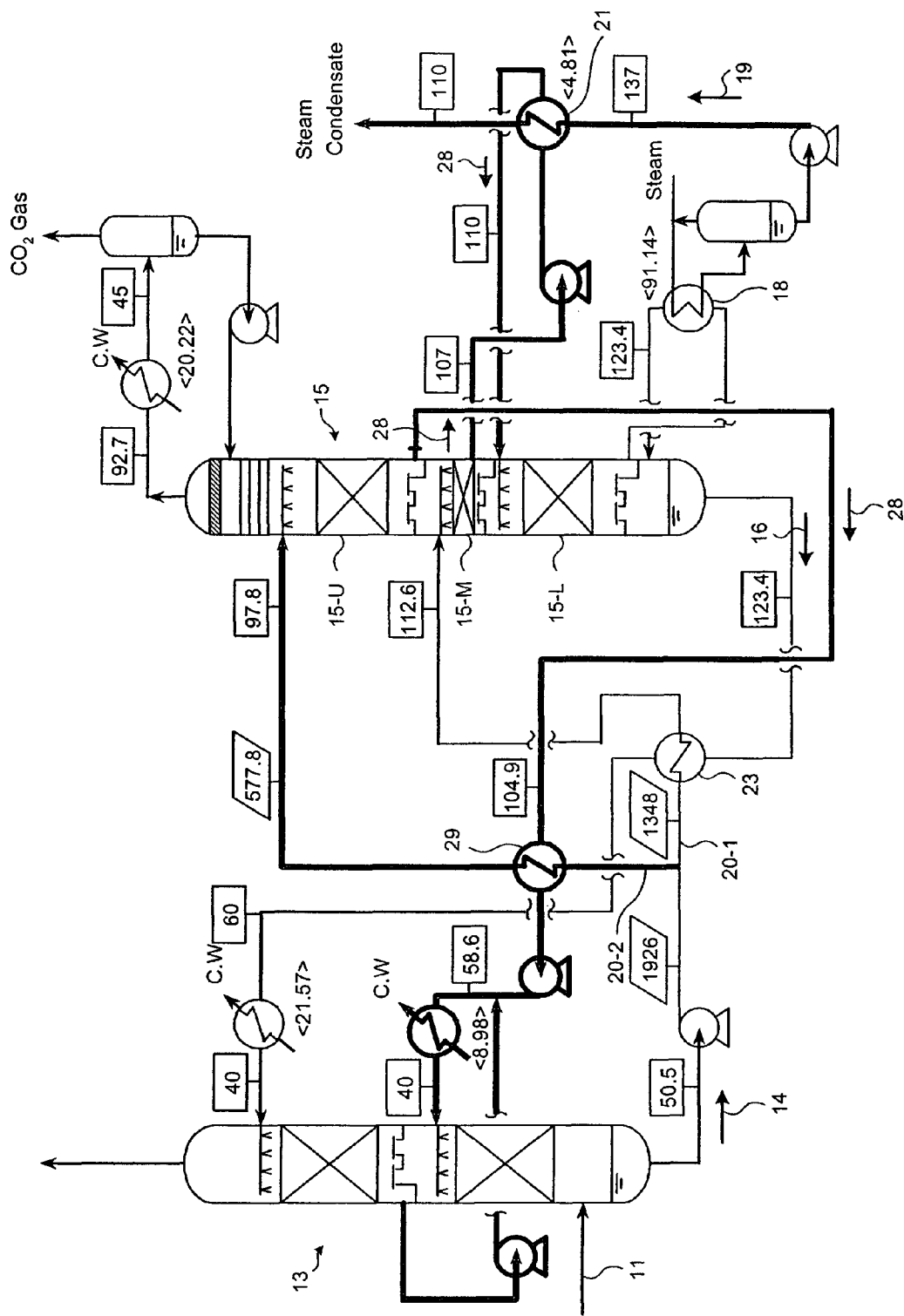
FIG. 21 is a schematic of a CO2 recovery system according to example 12.

FIG. 21 is a schematic of the CO2 recovery system according to example 12. Components the same as those of example 1 are assigned with the same reference numerals and explanation thereof is omitted.

In example 12, the regeneration tower 15 was divided into three portions such as the upper-portion regeneration tower 15-U, the middle-portion regeneration tower 15-M, and the lower-portion regeneration tower 15-L. The semi-lean solution 28 extracted from the middle-portion regeneration tower 15-M was heat-exchanged with the residual heat of the steam condensate in the steam-condensate heat exchanger 21.

Furthermore, the rich solution 14 was divided, and the lean-solution heat exchanger 23 was provided in the first rich-solution supply pipe 20-1. The semi-lean-solution heat exchanger 29 was provided in the second rich-solution supply pipe 20-2 where heat exchange was performed using the semi-lean solution 28 extracted from the upper-portion regeneration tower 15-U, so that the residual heat of the semi-lean solution was effectively used.

In example 12, as the result, the amount of steam consumed in the regeneration tower 15 became 91.14 MMkcal/h. Assuming the comparative example is 100, the amount of steam consumed in this example becomes 92.3%. Therefore, the reduction rate of specific steam consumption (improvement effect) was 7.7%.

INDUSTRIAL APPLICABILITY

The CO2 recovery system according to the present invention is suitable for reduction in the supply amount of heated steam used in the regeneration tower by effectively using the residual heat of the steam condensate and the residual heat of the semi-lean solution.

The invention claimed is:

1. A $CO_2$ recovery system including an absorption tower that receives $CO_2$-containing gas and $CO_2$-absorbing solution, and causes the $CO_2$-containing gas to come in contact with the $CO_2$-absorbing solution to produce $CO_2$ rich solution, and a regeneration tower, including an upper-portion regeneration tower and a lower-portion regeneration tower, that receives the rich solution and produces lean solution from the rich solution by removing $CO_2$ from the rich solution, the $CO_2$ recovery system comprising:
   a bottom lean-solution extraction path that extracts lean solution that accumulates near a bottom portion of the regeneration tower from a first point of the regeneration tower and returns extracted lean solution to a second point of the regeneration tower that is downstream of the first point;
   a regeneration heater arranged in the bottom lean-solution extraction path and heats the lean solution in the bottom lean-solution extraction path with saturated steam thereby producing steam condensate from the saturated steam;
   a steam-condensate heat exchanger that heats, with the steam condensate, either one of
      (a) the rich solution that is supplied from the absorption tower to the regeneration tower, and
      (b) a semi-lean solution that is extracted outside from a middle portion of the regeneration tower and returned to the middle portion of the regeneration tower;
   an upper semi-lean-solution extraction path that extracts semi-lean solution from an eleventh point of the upper-portion regeneration tower and returns extracted semi-lean solution to a twelfth point of the upper-portion regeneration tower that is downstream of the eleventh point;
   a lean-solution supply member that extracts the lean solution from the regeneration tower and conveys extracted lean solution to the absorption tower; and
   a lean-solution heat exchanger that is arranged in the upper semi-lean-solution extraction path and the lean-solution supply member and heats the semi-lean solution in the upper semi-lean-solution extraction path with the lean solution in the lean-solution supply member.

* * * * *